(12) United States Patent
Togawa et al.

(10) Patent No.: US 9,724,599 B2
(45) Date of Patent: Aug. 8, 2017

(54) OPERATOR AND OPERATING DEVICE

(75) Inventors: Keiji Togawa, Tokyo (JP); Takeshi Yamagishi, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 586 days.

(21) Appl. No.: 14/364,569

(22) PCT Filed: Dec. 20, 2011

(86) PCT No.: PCT/JP2011/079510
§ 371 (c)(1),
(2), (4) Date: Jun. 11, 2014

(87) PCT Pub. No.: WO2013/094014
PCT Pub. Date: Jun. 27, 2013

(65) Prior Publication Data
US 2014/0342829 A1   Nov. 20, 2014

(51) Int. Cl.
*A63F 13/20* (2014.01)
*A63F 13/24* (2014.01)
(Continued)

(52) U.S. Cl.
CPC ............ *A63F 13/06* (2013.01); *A63F 13/218* (2014.09); *A63F 13/24* (2014.09);
(Continued)

(58) Field of Classification Search
CPC .. A63F 2300/1043; A63F 13/06; A63F 13/24; A63F 2300/1006; A63F 13/218; H01H 2025/046
(Continued)

(56) References Cited

U.S. PATENT DOCUMENTS 8,263,889 B2 * 9/2012 Takahashi ............... A63F 13/24
200/512
2005/0284737 A1   12/2005 Shitanaka
(Continued)

FOREIGN PATENT DOCUMENTS

| JP | 60087035 | 6/1985 |
|---|---|---|
| JP | 06009025 | 2/1994 |
| JP | 200612695 | 1/2006 |

OTHER PUBLICATIONS

International Preliminary Report on Patentability and Written Opinion for corresponding PCT Application No. PCT/JP2011/079510, dated Jul. 3, 2014.
(Continued)

*Primary Examiner* — Edwin A. Leon
(74) *Attorney, Agent, or Firm* — Matthew B. Dernier, Esq.

(57) ABSTRACT

The operator includes: an operation body having a shaft section that extends along a first direction (Z direction), the operation body being operated by a user; a first detecting body to detect the rotational motion of the operation body about a rotational axis that extends along a plane, the plane being defined by second (X direction) and third (Y direction) directions, the second direction being orthogonal to the first direction, and the third direction being orthogonal to the first and second directions; and a second detecting body provided independently of the first detecting body to detect the translational motion of the operation body along the plane described above.

10 Claims, 11 Drawing Sheets

(51) Int. Cl.
*A63F 13/218* (2014.01)
*H01H 25/04* (2006.01)
(52) U.S. Cl.
CPC ................. *A63F 2300/1006* (2013.01); *A63F 2300/1043* (2013.01); *H01H 2025/046* (2013.01)
(58) Field of Classification Search
USPC ....... 463/37, 36; 200/18, 510–514, 5 R, 6 R, 200/343, 339, 5 A, 6 A; 273/148 B
See application file for complete search history.

(56) References Cited

U.S. PATENT DOCUMENTS

2009/0131171 A1    5/2009  Miyazaki
2015/0031457 A1*   1/2015  Togawa ................ G06F 3/0338
                                                463/38

OTHER PUBLICATIONS

Office Action for corresponding JP Application No. 2013-549990, dated Mar. 17, 2015.
International Search Report for corresponding PCT Application No. PCT/JP2011/079510, dated Feb. 7, 2012.

* cited by examiner

OPERATOR AND OPERATING DEVICE

TECHNICAL FIELD

The present invention relates to an operator and an operating device.

BACKGROUND ART

An operating device is known that is connected to an information processor such as PC (Personal Computer) or game console to transmit an operation signal to the information processor (refer, for example, to PTL 1). The controller (operating device) disclosed in PTL 1 includes left and right grip sections, directional keys, and operating buttons. The left and right grip sections are held by the left and right hands of the user. The directional keys and operating buttons are arranged on the front face of the controller. Of these, the directional keys are arranged at a position appropriate to that of the thumb of the left hand when the left grip section is held with the left hand. The operating buttons are arranged at a position appropriate to that of the thumb of the right hand when the right grip section is held with the right hand. Further, the controller includes two analog sticks between the directional keys and the operating buttons.

Each of the analog sticks has an orthogonal two-axis joystick structure and is arranged in a manner free to displace itself hemispherically. Then, when each of the analog sticks is operated, the controller outputs an operation signal appropriate to the direction of motion of the analog stick.

CITATION LIST

Patent Literature

[PTL 1]
US 2009/0131171 A1

SUMMARY

Technical Problem

A number of pieces of software are in circulation including game software that requires complicated operations in recent years. In a game called FPS (First Person shooter), for example, the line of sight of a character is changed or aim at a target is changed while at the same time moving the character. On the other hand, the controller disclosed in PTL 1 detects the upward, downward, leftward, and rightward directions with the directional keys and the pan and tilt directions with the analog sticks. However, a controller (operating device) has been requested which can deal with game software that requires even more complicated operations and which can detect a variety of directions with a single operator.

It is an object of the present invention to provide an operator and an operating device capable of detecting more operation directions.

Solution to Problem

In order to achieve the above object, an operator according to a mode of the present invention includes an operation body having a shaft section that extends along a first direction, the operation body being operated by a user; a first detecting body adapted to detect a rotational motion of the operation body about a rotational axis that extends along a plane, the plane being defined by second and third directions, the second direction being orthogonal to the first direction, and the third direction being orthogonal to the first and second directions; and a second detecting body provided independently of the first detecting body to detect a translational motion of the operation body along the plane.

Further, an operating device according to a mode of the present invention includes the operator.

DESCRIPTION OF EMBODIMENTS

[First Embodiment]

A description will be given below of a first embodiment of the present invention with reference to the accompanying drawings.

Figure 1:
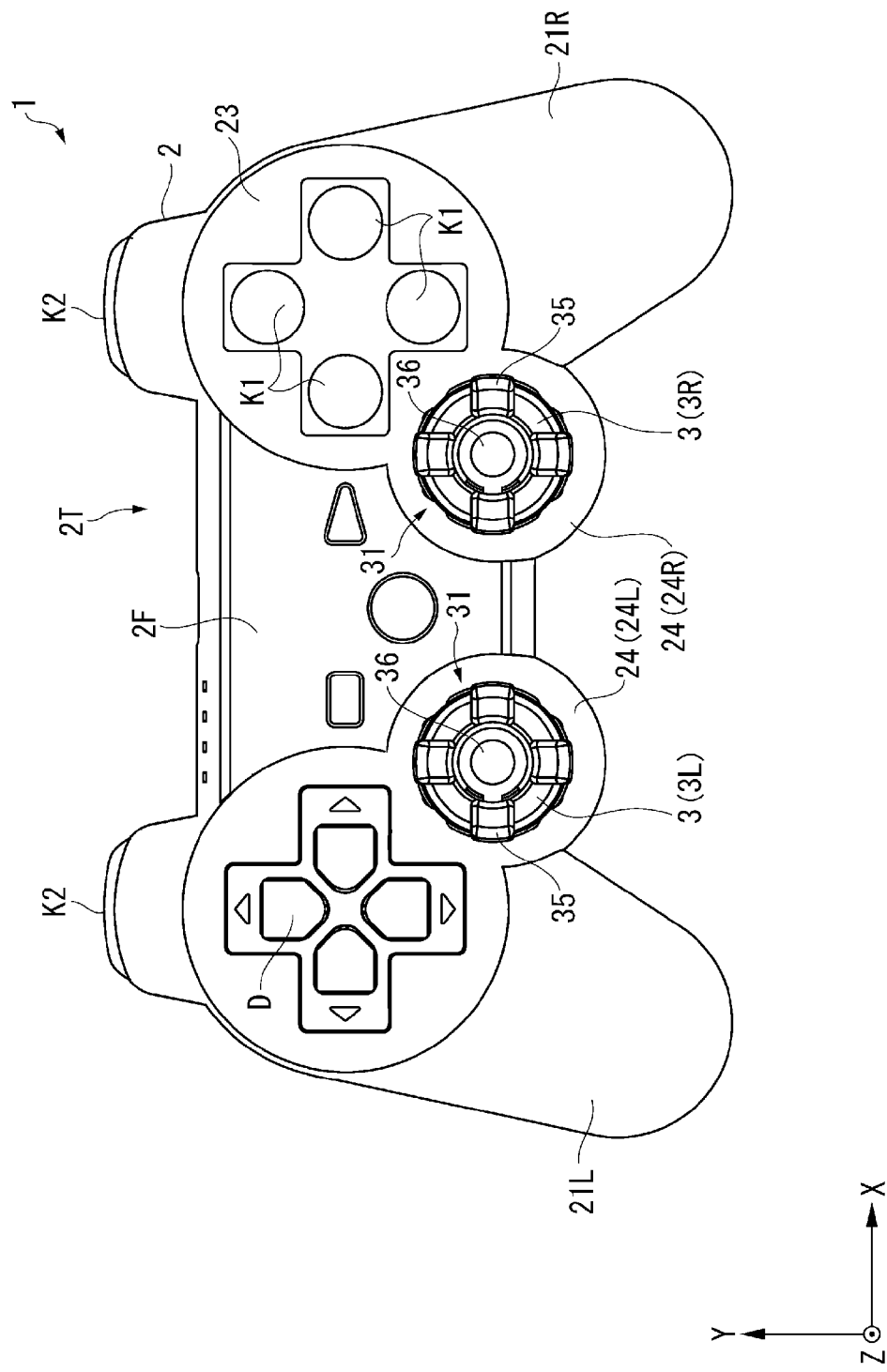
FIG. 1 is a front view illustrating an operating device according to a first embodiment.
Figure 2:
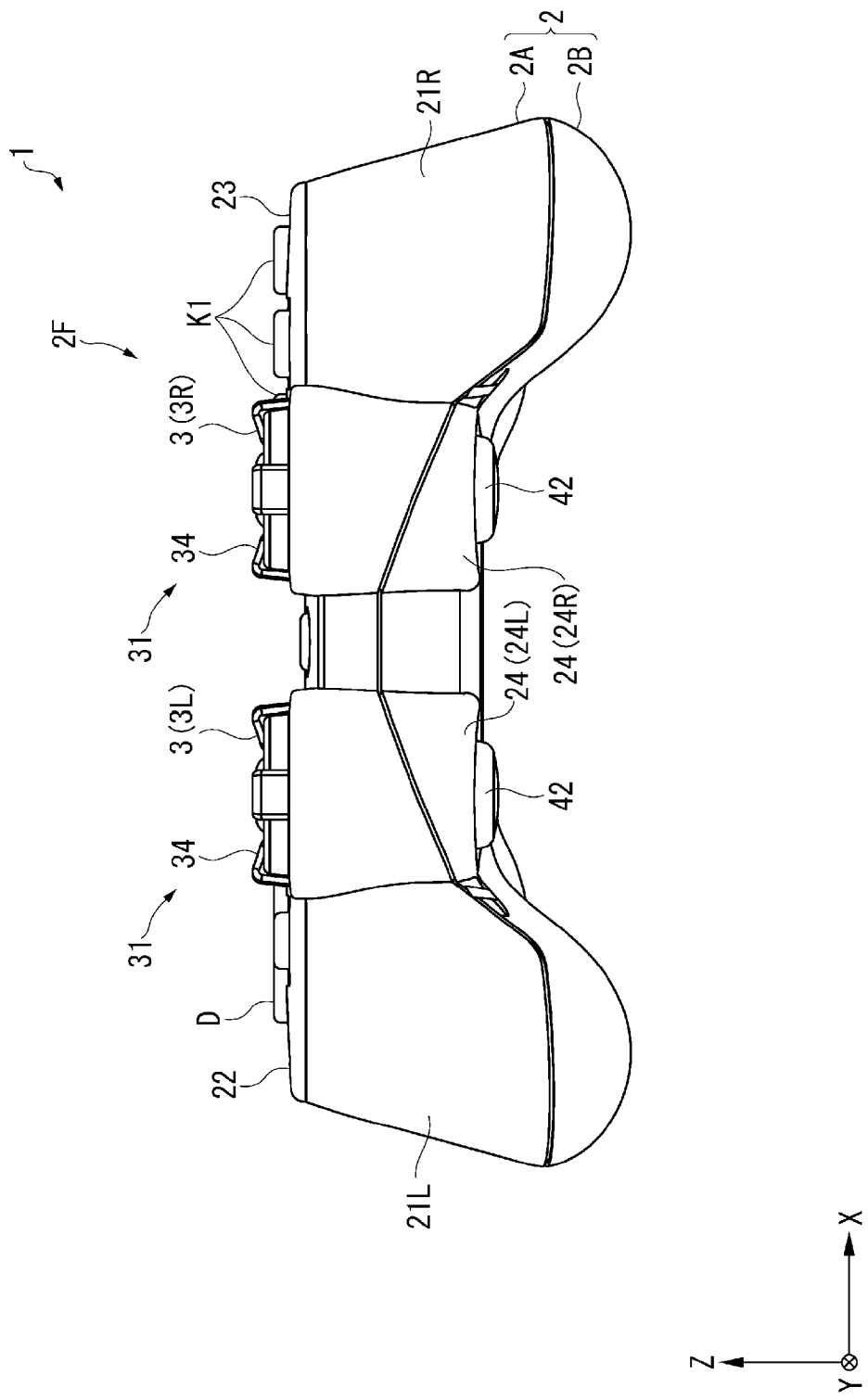
FIG. 2 is a side view illustrating the operating device according to the first embodiment.

FIGS. 1 and 2 are front and side views illustrating an operating device 1 according to the present embodiment. It should be noted that the X and Y directions are the rightward and upward directions, respectively, when one sees an exterior enclosure 2 from the front while holding the exterior enclosure 2. The Z direction is the direction toward the front as one sees the exterior enclosure 2 from the front. That is, the X, Y, and Z directions are orthogonal to each other. On the other hand, the X and Y directions correspond, respectively, to second and third directions in the present invention. The Z direction corresponds to a first direction in the present invention.

The operating device 1 according to the present embodiment is connected to an information processor such as PC or game console to transmit an operation signal to the information processor in response to an input operation of the user. The operating device 1 includes the exterior enclosure 2 made of synthetic resin as illustrated in FIGS. 1 and 2.

[Configuration of the Exterior Enclosure]

The exterior enclosure 2 includes a front case 2A and a rear case 2B. The front case 2A is located on the front side (tip side in the Z direction). The rear case 2B is located on the rear side (root side in the Z direction). The exterior enclosure 2 configured as described above has left and right grip sections 21L and 21R. The left grip section 21L is held with the left hand of the user. The right grip section 21R is held with the right hand of the user.

On a front face 2F of the exterior enclosure 2A, a first disposition section 22 is arranged at a position appropriate to that of the thumb of the left hand when the left grip section 21L is held with the left hand. Directional keys D are arranged on the first disposition section 22. Further, on the front face 2F, a second disposition section 23 is arranged at a position appropriate to that of the thumb of the right hand when the right grip section 21R is held with the right hand. Four operating keys K1 are arranged on the second disposition section 23.

In addition to the above, operator disposition sections 24 (left and right operator disposition sections are respectively denoted by 24L and 24R) are arranged between the first and second disposition sections 22 and 23 on the front face 2F. Operators 3 (left and right operators are respectively denoted by 3L and 3R) are provided on the operator disposition sections 24.

Further, other operating keys K2 are provided, one at left and another at right, on an upper face 2T of the exterior enclosure 2. The operating keys K2 are arranged at positions appropriate to those of the index fingers of the left and right hands of the user.

When the operating device 1 configured as described above is used, the user holds the left and right grip sections 21L and 21R, for example, in such a manner as to cover these sections with the palms and the third and little fingers of the left and right hands. Then, the user inputs the operating keys K2 with the left and right index fingers, and inputs one of the directional keys D and one of the operating keys K1 with the left and right thumbs. Further, in order to operate the operators 3L and 3R in the above condition, the user does so with the left and right thumbs. It should be noted that each of the operators 3L and 3R can be operated by pinching it with the left or right thumb and another finger (e.g., third finger).

[Configuration of the Operator]

Figure 3:
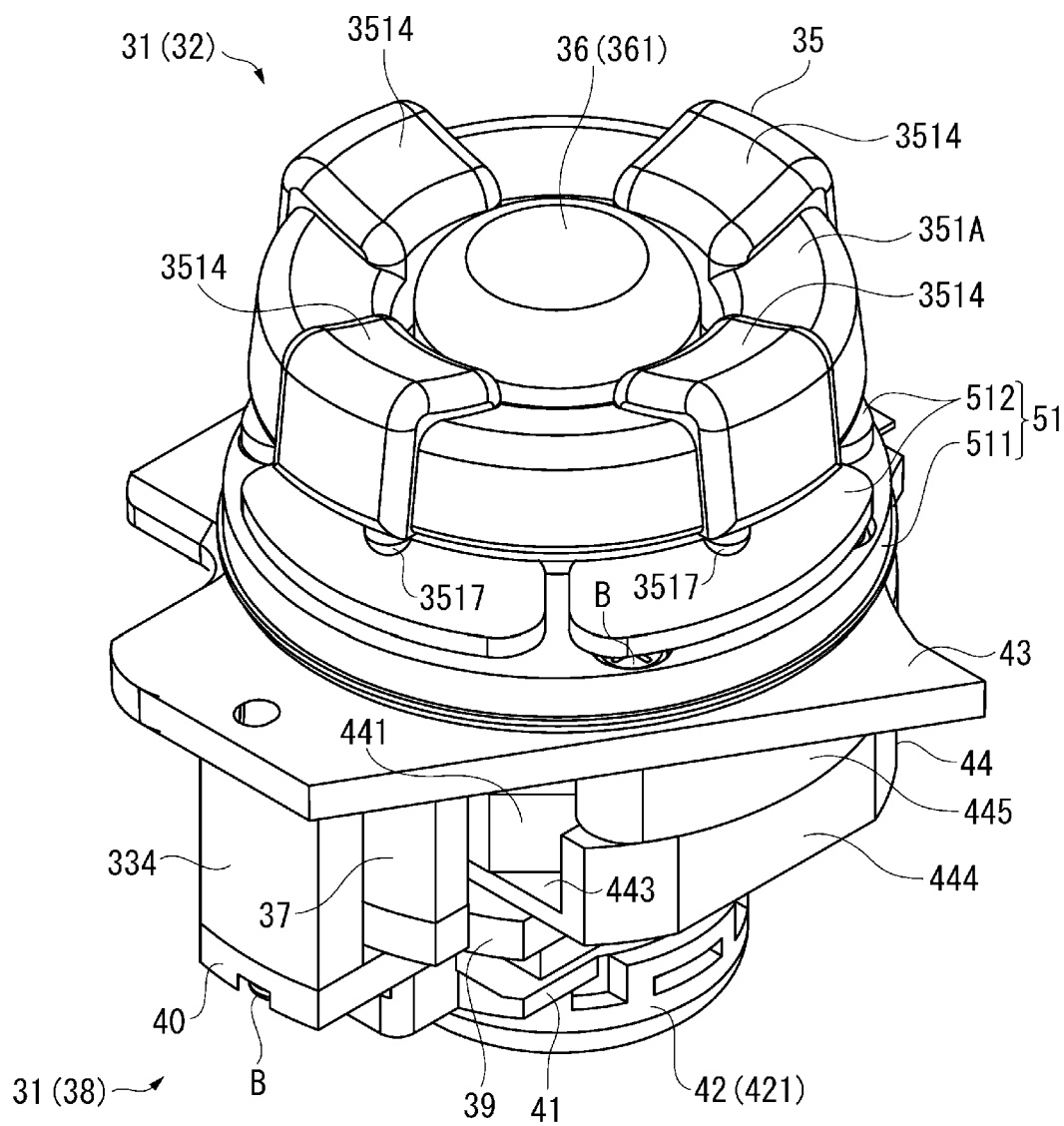
FIG. 3 is a perspective view illustrating an operator according to the first embodiment.
Figure 4:
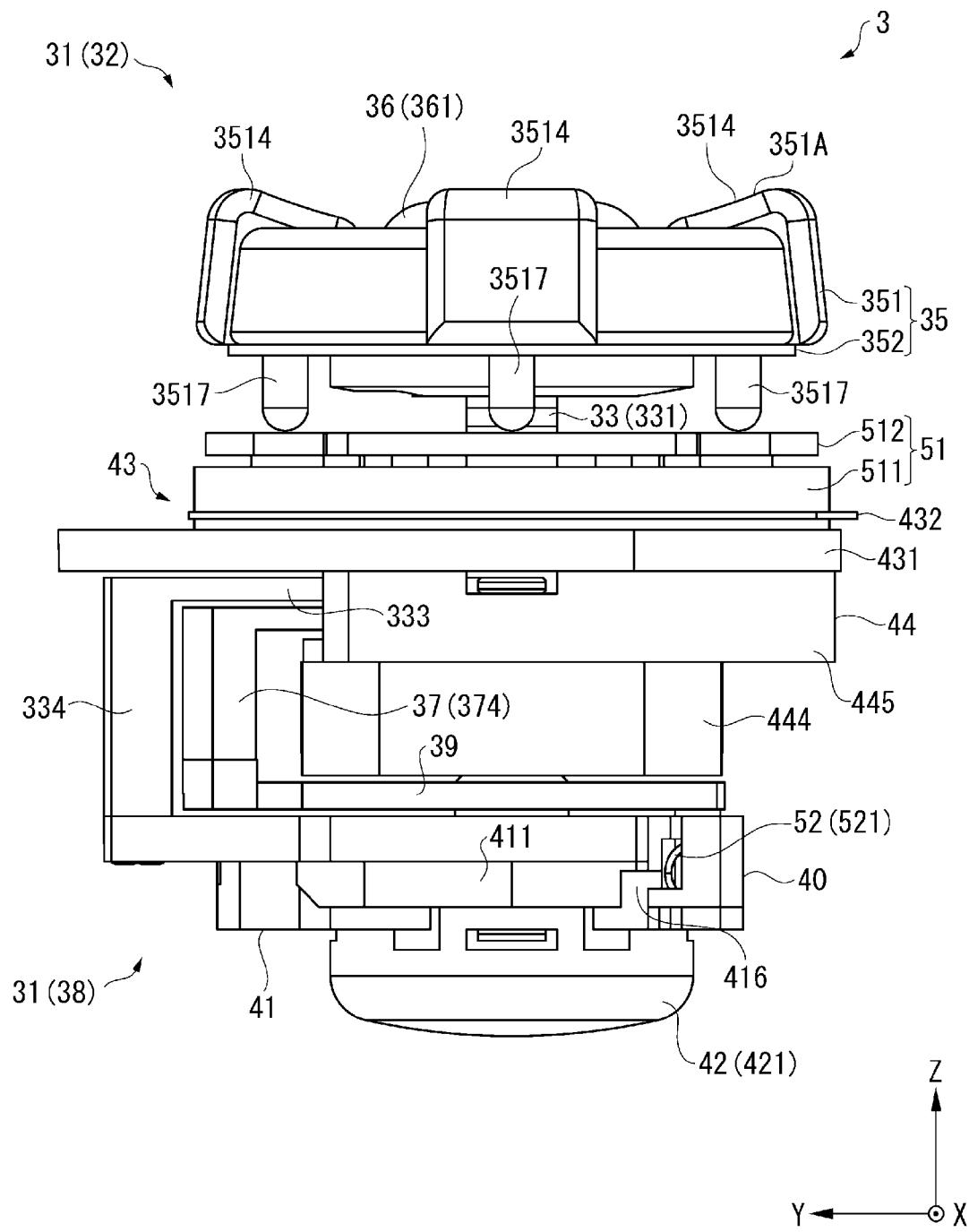
FIG. 4 is a side view illustrating the operator according to the first embodiment.
Figure 5:
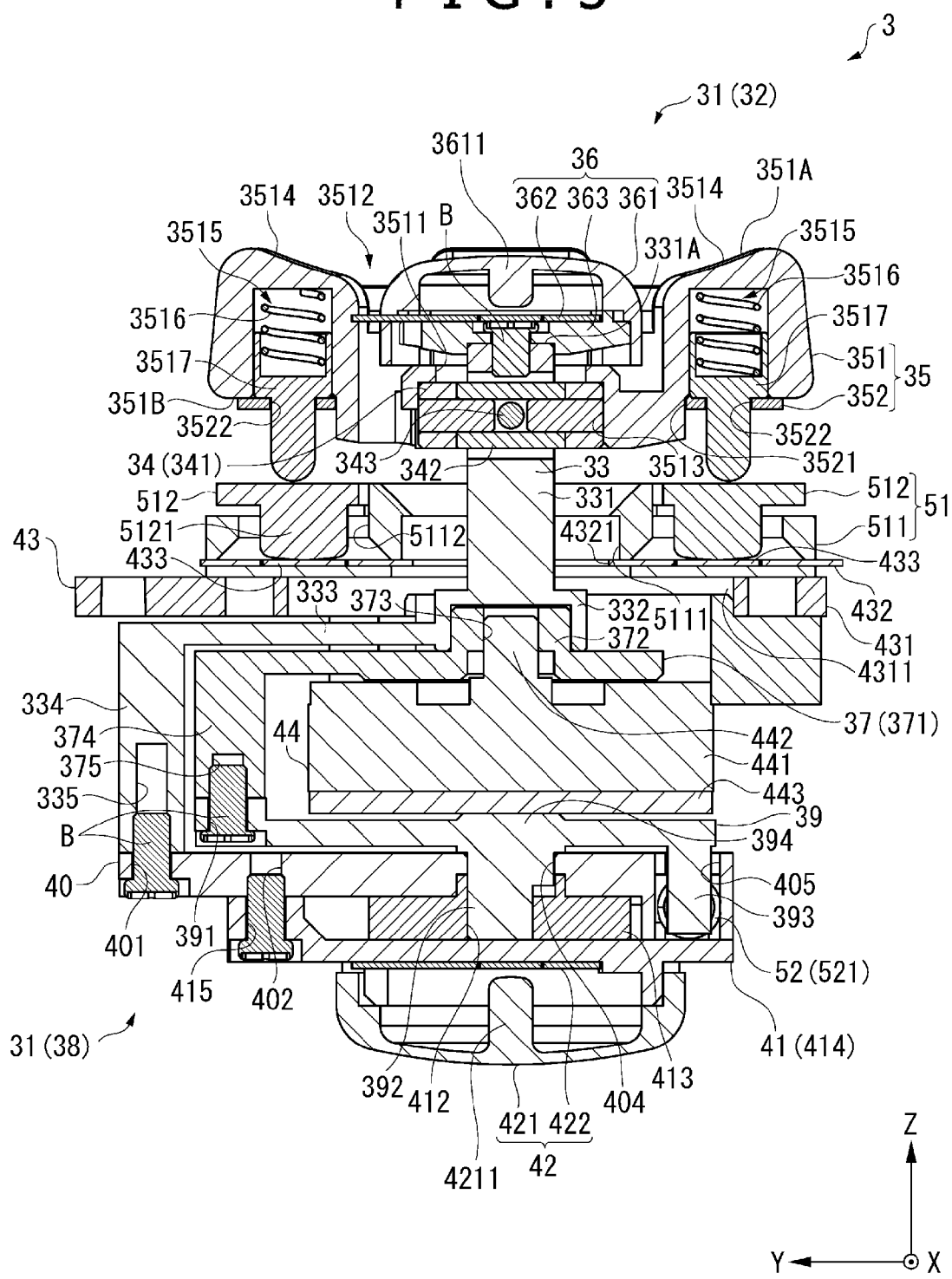
FIG. 5 is a cross-sectional view illustrating the operator according to the first embodiment.
Figure 6:
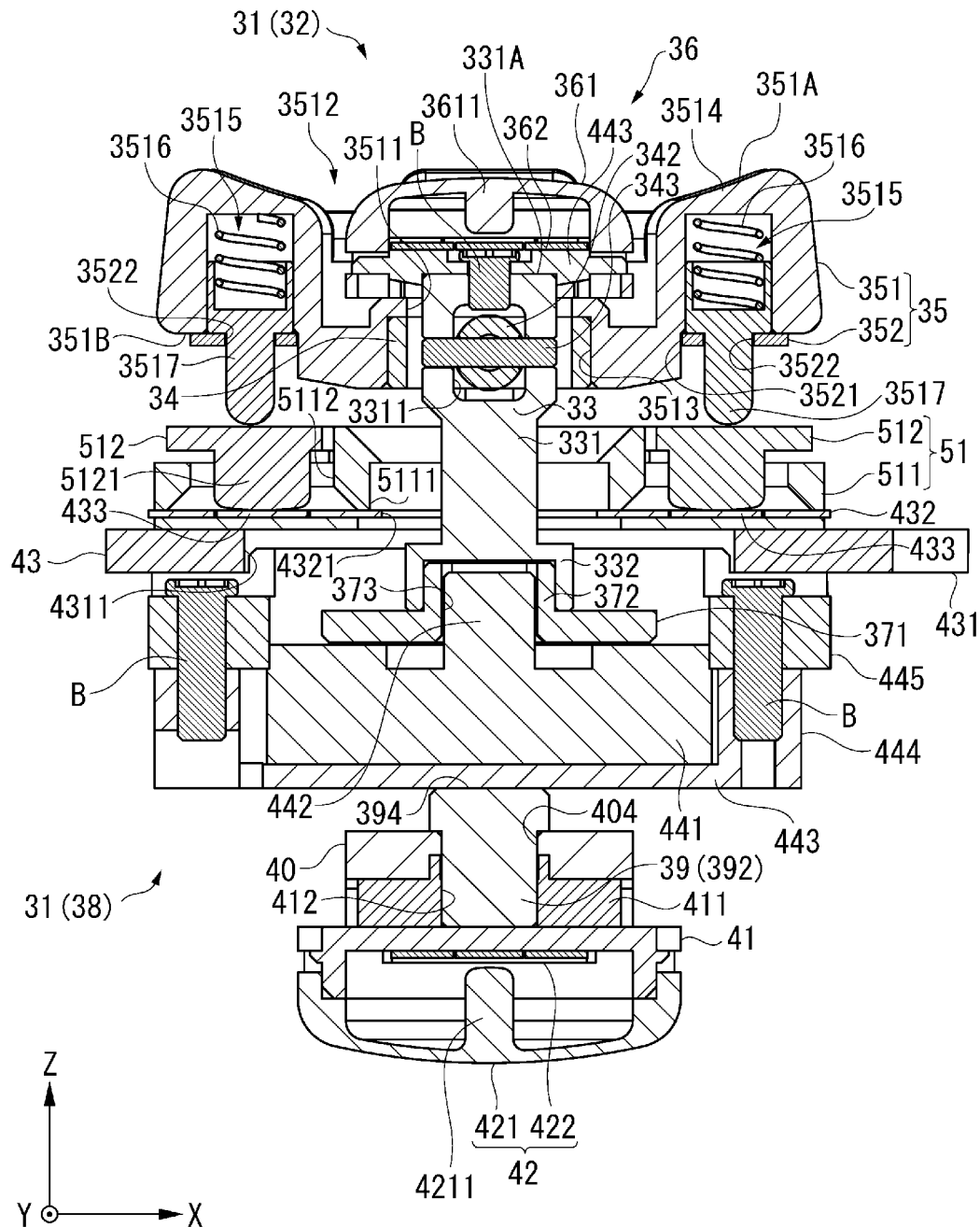
FIG. 6 is a cross-sectional view illustrating the operator according to the first embodiment.
Figure 7:
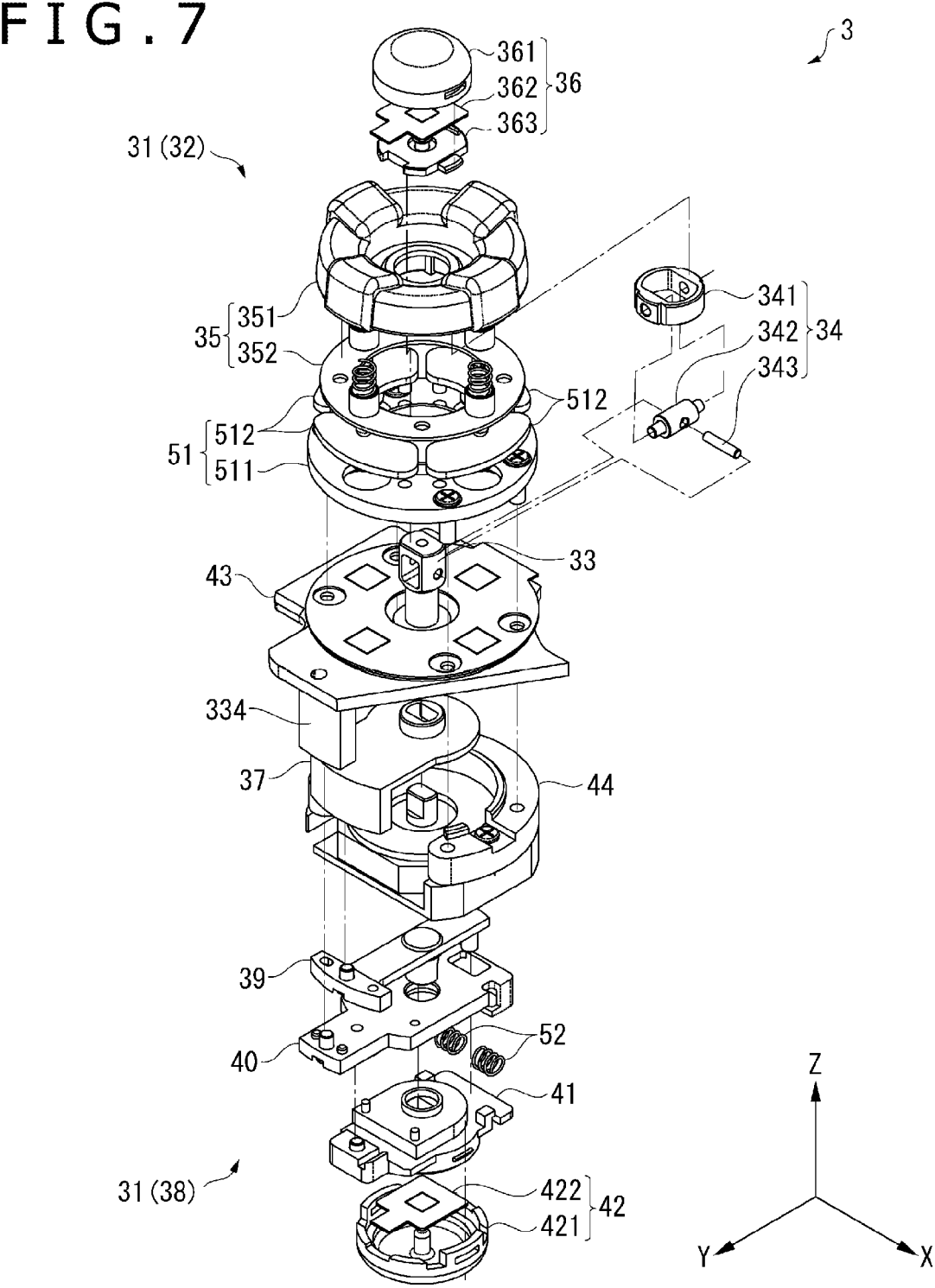
FIG. 7 is an exploded perspective view illustrating the operator according to the first embodiment.
Figure 8:
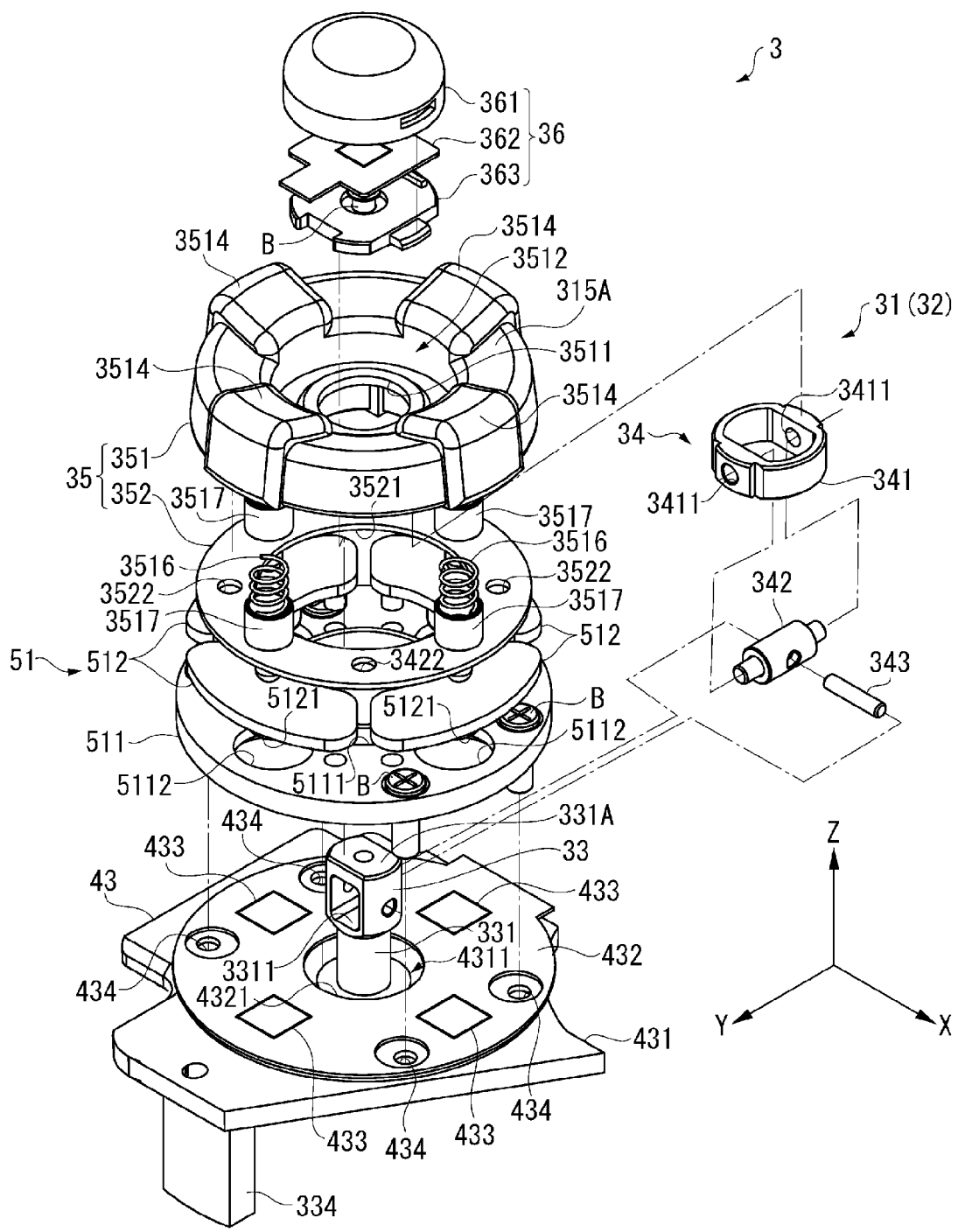
FIG. 8 is an exploded perspective view illustrating the configuration of the upper portion of the operator according to the embodiment.
Figure 9:
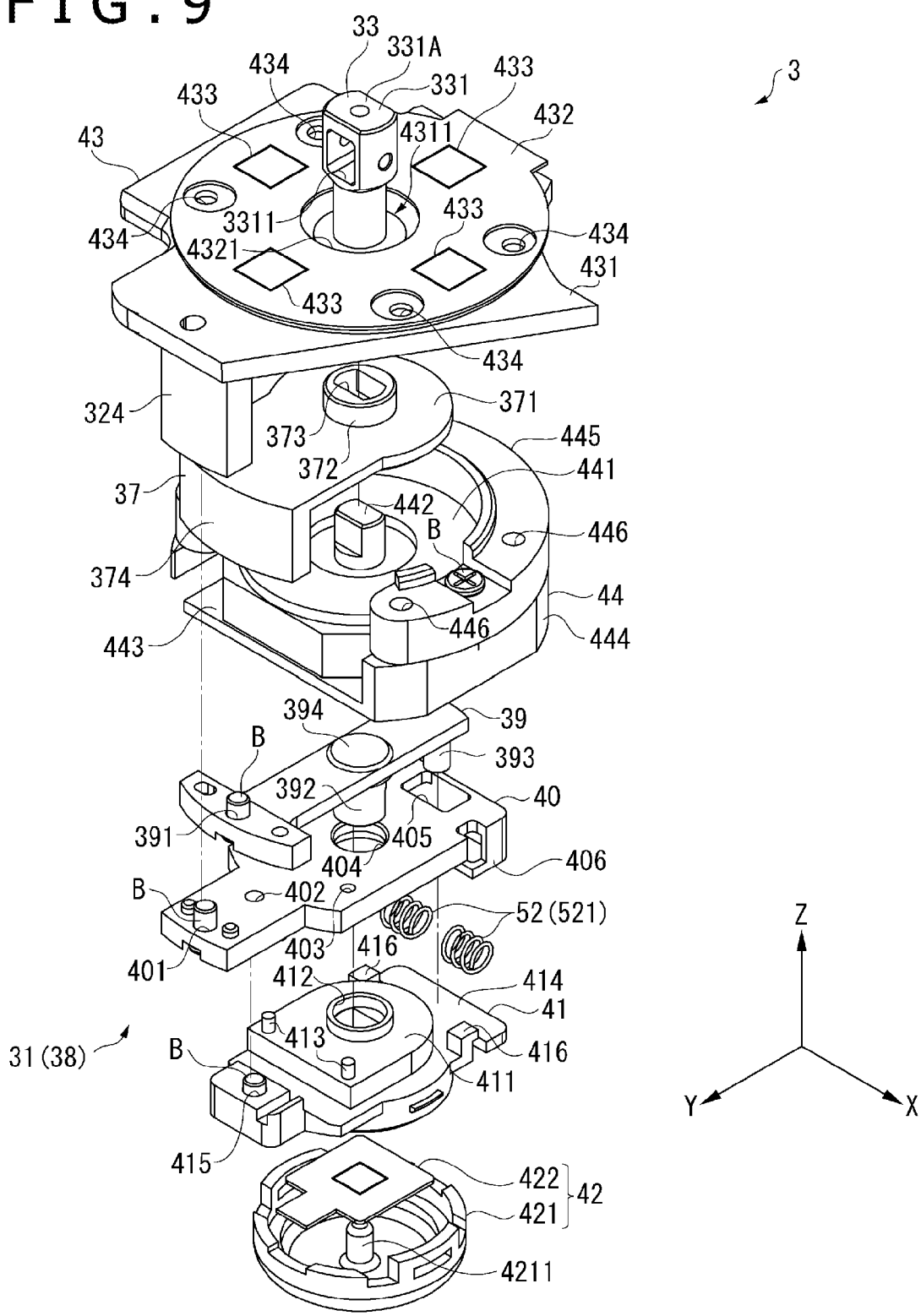
FIG. 9 is an exploded perspective view illustrating the configuration of the lower portion of the operator according to the embodiment.

FIG. 3 is a perspective view illustrating the operator 3, and FIG. 4 is a side view illustrating the operator 3 as seen from the tip side in the X direction. Further, FIGS. 5 and 6 are cross-sectional views illustrating the operator 3 respectively in YZ and XZ planes. FIG. 7 is an exploded perspective view illustrating the operator 3. Still further, FIGS. 8 and 9 are exploded perspective views illustrating the configuration of the upper and lower portions of the operator 3, respectively. The operator 3 includes an operation body 31, first and second detecting bodies 43 and 44, a pressing body 51, and a biasing member 52 as illustrated in FIGS. 3 to 9. The operation body 31 is displaced (translated and rotated) as it is operated by the user. Then, the operator 3 is a six-axis sensor adapted to detect the displacement of the operation body 31 in directions along six axes using not only the detecting bodies 43 and 44 but also third, fourth, and fifth detecting bodies 41, 42, and 36 making up the operation body 31.

[Configuration of the Operation body]

The operation body 31 is translated along an XY plane (plane defined by the X and Y directions) as it is operated by the user. Further, the operation body 31 is rotated about the rotational axis that extends along the Z direction. Further, a component (operation section 35) of the operation body 31 is rotated about the rotational axis that extends along the XY plane. In addition, some other components (pressing operation sections 361 and 421 of the fifth and fourth detecting bodies 36 and 42) are displaced along the Z direction. The operation body 31 configured as described above transfers, to the detecting bodies 36 and 41 to 44, the displacements of the operation section 35 and the pressing operation sections 361 and 421 that are directly operated by the user.

The operation body 31 configured as described above includes a displacement section 32 and a tracking section 38 as illustrated in FIGS. 5 to 8. The displacement section 32 is displaced as it is operated by the user. The tracking section 38 is displaced in response to the displacement of the displacement section 32. The displacement section 32 includes a main body section 33, an attachment member 34, the operation section 35, the fifth detecting body 36, and a first connecting section 37. Then, the displacement section 32 and the pressing body 51 are located on the tip side in the Z direction (on the side of the front case 2A) relative to the first detecting body 43 as illustrated in FIGS. 7 and 8.

Further, the tracking section 38 includes second and third connecting sections 39 and 40, and the third and fourth detecting bodies 41 and 42. The second connecting section 39 is connected to the first connecting section 37. The third connecting section 40 is connected to the main body section 33. The third and fourth detecting bodies 41 and 42 are attached to the third connecting section 40. Then, the tracking section 38, the second detecting body 44, and the biasing member 52 are located on the root side in the Z direction (on the side of the rear case 2B) relative to the first detecting body 43 as illustrated in FIG. 9.

Then, the direction of rotational motion of the operation body 31 about the rotational axis that extends along the XY plane is detected by the combination of the displacement section 32, the pressing body 51, and the first detecting body 43 (XY rotational motion detection device). Further, the direction of translational motion of the operation body 31 along the XY plane is detected by the combination of the displacement section 32 and the second detecting body 44 (XY translational motion detection device). Still further, the direction of rotational motion of the operation body 31 about the rotational axis that extends along the Z direction is detected by the combination of the displacement section 32 and the tracking section 38 having the third detecting body 41 (Z rotational motion detection device). In addition, the pressing operation of the operation body 31 toward the root side in the Z direction is detected by the fifth detecting body 36 (first Z translational motion detection device) that makes up the displacement section 32. Further, the pressing operation of the operation body 31 toward the tip side in the Z direction is detected by the fourth detecting body 42 (second Z translational motion detection device) that makes up the tracking section 38. Then, although described in detail later, the detecting bodies 36 and 41 to 44 share the central axis of a shaft section 331 as their central axes. The shaft section 331 makes up the main body section 33. A detailed description will be given below of each of the components.

[Configuration of the Main Body Section]

The main body section 33 supports the operation section 35 via the attachment member 34. Further, the main body section 33 supports the fifth detecting body 36. The main body section 33 is an integrally molded piece having the shaft section 331, a fitting section 332 (FIGS. 5 and 6), an extension section 333 (FIG. 5), and a standing section 334 (FIG. 5) as illustrated in FIGS. 5, 6, and 8.

The shaft section 331 is a portion that serves as a rotational axis when the operation body 31 is rotated about the rotational axis that extends along the Z direction (the first direction in the present invention). The shaft section 331 is formed in an approximately cylindrical shape that extends along the Z direction. An operation section 331A is formed as a flat surface on the end portion of the shaft section 331 on the tip side in the Z direction as illustrated in FIGS. 6 and 8. The operation section 331A displaces the shaft section 331 (translates the shaft section 331 along the XY plane and rotates the shaft section 331 about the rotational axis along the Z direction). The fifth detecting body 36 which will be described later is provided on the operation section 331A.

Further, an opening portion 3311 is formed near the end portion of the shaft section 331 on the tip side in the Z direction. The opening portion 3311 penetrates the shaft section 331 along the Y direction. A pin 342 of the attachment member 34 is arranged in the opening portion 3311. The pin 342 is fastened by a pin 343 that is attached to the shaft section 331 along the X direction.

The fitting section 332 is formed in an approximately cylindrical shape on the root side of the shaft section 331 in the Z direction as illustrated in FIGS. 5 and 6. The outer diameter of the fitting section 332 is larger than that of the shaft section 331. The fitting section 332 is open toward the root side in the Z direction. A boss 372 of the first connecting section 37 which will be described later is fitted in the opening of the fitting section 332. As a result, the main body section 33 is attached to the boss 372 in a manner free to rotate about the rotational axis that extends along the Z direction.

The extension section 333 extends along the XY plane from the side face of the fitting section 332 and extends toward the tip side in the Y direction as illustrated in FIG. 5.

The standing section 334 stands from the tip portion of the extension section 333 (tip portion in the Y direction) in the extending direction toward the root side in the Z direction. A threaded hole 335 is formed in the end face of the standing section 334 on the root side in the Z direction. A screw B is screwed in the threaded hole 335 to fasten the third connecting section 40 which will be described later.

[Configuration of the Attachment Member]

The attachment member 34 is used to attach the operation section 35 to the shaft section 331 in a manner free to rotate about the rotational axis that extends along the XY plane (free to tilt). The attachment member 34 includes the pins 342 and 343, and a ring-shaped body 341 as illustrated in FIGS. 5, 6, and 8.

Of these, the pin 342 is configured in such a manner that the two end portions thereof that extend in the direction along the central axis of the pin 342 (Y direction) are free to project or retract. The two end portions are biased outward.

The ring-shaped body 341 is formed in an annular shape as seen from the Z direction as illustrated in FIGS. 5, 6 and 8. The ring-shaped body 341 is attached to the shaft section 331 and serves as a gimbal. The ring-shaped body 341 has two hole portions 3411 as illustrated in FIG. 8. The hole portions 3411 penetrate the ring-shaped body 341 along the Y direction. Then, the ring-shaped body 341 is attached to the shaft section 331 in a manner free to tilt as illustrated in FIG. 5 as the two ends of the pin 342 are inserted into the hole portions 3411. The ring-shaped body 341 configured as described above is fitted into a recessed portion 3513 formed approximately at the center of the operation section 35 as illustrated in FIGS. 5 and 6, thus allowing for attachment of the operation section 35 to the shaft section 331 in a manner free to tilt.

[Configuration of the Operation Section]

The operation section 35 is attached near the end portion of the shaft section 331 of the main body section 33 on the tip side in the Z direction using the attachment member 34 in a manner free to tilt (in other words, free to rotate about the rotational axis that extends along the XY plane) as described earlier. The operation section 35 accepts input operations of the user (operations for translational motion along the XY plane, rotational motion about the rotational axis that extends along the XY plane, and rotational motion about the rotational axis along the Z direction). The operation section 35 functions as a first operation section in the operator 3. More specifically, if the user makes a translational motion operation along the XY plane for the operation section 35, the operation section 35 moves together with the main body section 33. Further, if the user makes a rotational motion operation about the rotational axis along the Z direction for the operation section 35, the operation section 35 rotates together with the main body section 33. On the other hand, if the user makes a rotational motion operation about the rotational axis that extends along the XY plane for the operation section 35, the operation section 35 tilts independently of the main body section 33 (shaft section 331).

The operation section 35 configured as described above is formed to spread outward in the direction of diameter of the shaft section 331, i.e., formed in the shape of a flange. When tilting relative to the shaft section 331, the operation section 35 presses a pressure-sensing element 433 provided on the first detecting body 43 via a presser 512 which will be described later. The operation section 35 configured as described above has an operation section main body 351 and a retaining portion 352 as illustrated in FIGS. 5, 6 and 8.

Of these, the retaining portion 352 is formed in an annular shape and attached to the operation section main body 351 on the root side in the Z direction as illustrated in FIG. 8. A hole portion 3521 is formed in the retaining portion 352. The shaft section 331 and the attachment member 34 are inserted into the hole portion 3521. Further, hole portions 3522 are formed in the retaining portion 352 equidistantly along the outer perimeter of the retaining portion 352. A projecting portion 3517 which will be described later is inserted into each of the hole portions 3522. It should be noted that although a total of eight hole portions 3522 are formed in the retaining portion 352, the four hole portions 3522 that are formed equidistantly are used in the present embodiment.

The operation section main body 351 has a hole portion 3511 along its central axis as illustrated in FIGS. 5, 6, and 8. The shaft section 331 is inserted into the hole portion 3511. Further, a recessed portion 3512 is formed in the operation section main body 351 on the tip side in the Z direction. The operation section 331A of the shaft section 331 inserted into the hole portion 3511 is located inside the recessed portion 3512. Then, the fifth detecting body 36 is arranged on the operation section 331A.

Further, a recessed portion 3513 (FIGS. 5 and 6) is formed on the root side of the operation section main body 351 in the Z direction. The ring-shaped body 341 is fitted into the recessed portion 3513.

Further, a face 351A of the operation section main body 351 on the tip side in the Z direction tilts toward the center where the hole portion 3511 is located. Projecting portions 3514 are formed equidistantly along the outer perimeter of the operation section main body 351 on the face 351A as illustrated in FIG. 8. The projecting portions 3514 are formed to provide more resistance to the user's finger.

Still further, on a face 351B of the operation section main body 351 on the root side in the Z direction, four arrangement sections 3515 are formed at equidistant positions appropriate to those of the projecting portions 3514 along the outer perimeter as illustrated in FIGS. 5 and 6. The arrangement sections 3515 are formed between the edge of the recessed portion 3513 and the outer perimeter of the operation section main body 351. The arrangement sections 3515 are formed as recessed portions that are recessed to such an extent that they do not penetrate the operation section main body 351. Then, a biasing member 3516 and the projecting portion 3517 are arranged in each of the arrangement sections 3515.

The biasing member 3516 includes a compression spring to bias the projecting portion 3517 toward the root side in the Z direction (i.e., the direction toward the first detecting body 43). It should be noted that the biasing member 3516 may include an elastic body such as rubber. The projecting portion 3517 is formed with synthetic resin in the shape of a rigid pin. The four projecting portions 3517 are provided for the four pressure-sensing elements 433 of the first detecting body 43 which will be described later. Then, when the operation section 35 is tilted relative to the shaft section 331 by the operation of the user, the projecting portion 3517 presses the pressure-sensing element 433 at the appropriate position via the pressing body 51.

Each of these projecting portions 3517 is inserted into one of the hole portions 3522 formed in the retaining portion 352 described above. The outer diameter of the end portion of each of the projecting portions 3517 on the tip side in the Z direction is larger than the inner diameter of each of the hole portions 3522. This prevents the projecting portions 3517 from falling off the arrangement sections 3515 when the retaining portion 352 is attached to the operation section main body 351.

When the operation section 35 configured as described above is tilted relative to the shaft section 331 by the operation of the user, the projecting portion 3517 presses the pressure-sensing element 433 via the pressing body 51. At this time, the projecting portion 3517 resists the biasing force of the biasing member 3516 and retracts into the arrangement section 3515. After this, when the pressing operation is cancelled, the projection of the projecting portion 3517 from the arrangement section 3515 is restored to the initial state by the biasing force of the biasing member 3516. As a result, the operation section 35 returns to its initial position (position prior to tilting relative to the shaft section 331 following the pressing).

[Configuration of the Pressing Body]

The pressing body 51 transfers the pressing force exerted by the projecting portion 3517 to the pressure-sensing element 433. The pressing body 51 includes a pedestal section 511 and the presser 512 as illustrated in FIGS. 5, 6, and 8.

A hole portion 5111 is formed in an annular shape and at the center of the pedestal section 511. The shaft section 331 is inserted into the hole portion 5111. Further, a plurality of hole portions (not shown) are formed in the pedestal section 511 along the outer perimeter thereof. The screws B (FIG. 8) are attached to these hole portions. The screws B are inserted into the first detecting body 43 to fasten the pedestal section 511 to the second detecting body 44. As a result, the pedestal section 511 is fastened in such a manner as to cover a detection section 432 of the first detecting body 43 from the tip side in the Z direction.

Further, four hole portions 5112 are formed in the pedestal section 511 along the outer perimeter thereof. These four hole portions 5112 are formed at positions appropriate to those of the projecting portions 3517. A pressing section 5121 of the presser 512 is located in each of the hole portions 5112. The pressing section 5121 comes in contact with the appropriate pressure-sensing element 433.

In the present embodiment, the four pressers 512 are provided equidistantly along the outer perimeter of the pedestal section 511. More specifically, each of the pressers 512 is formed with an elastic body such as rubber in the form of not only a quarter arc but also a flat plate as illustrated in FIG. 8. Further, each of the pressers 512 is arranged on the tip side of the pedestal section 511 in the Z direction (i.e., on the side of the operation section 35). Therefore, the pressers 512 are arranged between the operation section 35 and the first detecting body 43.

These pressers 512 are provided for the projecting portions 3517 described above as illustrated in FIGS. 5 and 6. Each of the pressers 512 has the pressing section 5121 that comes in contact with the pressure-sensing element 433. Each of these pressing sections 5121 presses the pressure-sensing element 433 when the presser 512 is pressed by the appropriate projecting portion 3517, thus transferring the pressing force of the operation section 35 transferred from the projecting portion 3517 to the pressure-sensing element 433. It should be noted that a given clearance is provided between the presser 512 and the projecting portion 3517.

[Configuration of the First Detecting Body]

A description will be given here of the first detecting body 43.

The first detecting body 43 is located approximately at the center of the operator 3 in the Z direction. The first detecting body 43 detects the rotational motion of the operation section 35 operated by the user about the rotational axis along the XY plane (tilt of the operation section 35 relative to the shaft section 331). The first detecting body 43 configured as described above includes a base section 431, the detection section 432, and four insertion holes 434 as illustrated in FIGS. 5, 6, and 8. The detection section 432 has the four pressure-sensing elements 433.

The base section 431 is formed in the shape of a flat plate. The detection section 432 is provided on the face of the base section 431 on the tip side in the Z direction (face opposed to the pressing body 51). A hole portion 4311 is formed approximately at the center of the base section 431. The shaft section 331 is inserted into the hole portion 4311.

The detection section 432 is formed in an annular shape as seen from the Z direction. A hole portion 4321 is formed at a position appropriate to that of the hole portion 4311. Further, each of the pressure-sensing elements 433 is provided at a position of the detection section 432 appropriate to that of one of the pressing sections 5121.

That is, the four pressure-sensing elements 433 are arranged equidistantly along the outer perimeter of the detection section 432. In other words, the pressure-sensing elements 433 are arranged equidistantly along the circumference of the shaft section 331 that is inserted into the hole portion 4321.

If the operation section 35 is rotated about the rotational axis along the XY plane (if the operation section 35 is tilted relative to the shaft section 331), these pressure-sensing elements 433 are pressed by the projecting portions 3517 via the pressing sections 5121 as described earlier. Then, the detection section 432 outputs, to a controller not shown, a signal indicating the pressed pressure-sensing element 433 (which pressure-sensing element 433 was pressed), the position pressed on the detection surface of the pressure-sensing element 433 (which position of the detection surface was pressed), and the pressing force detected by the pressure-sensing element 433. The controller is provided in the exterior enclosure 2.

It is possible to determine in which direction the operation section 35 was pressed as the controller determines which pressure-sensing element 433 was pressed and which position of the detection surface of the pressure-sensing element 433 was pressed. Further, it is possible to determine the pressure with which the operation section 35 was pressed as the controller determines the detected pressing force.

The four insertion holes 434 are each formed between the pressure-sensing elements 433. The screws B are each inserted into one of the insertion holes 434 to fasten the pedestal section 511 to the second detecting body 44. As a result, the first detecting body 43 is fastened to the second detecting body 44 together with the pedestal section 511.

[Configuration of the Fifth Detecting Body]

The fifth detecting body 36 detects the pressing operation of the operation body 31 toward the root side in the Z direction by the user.

More specifically, the fifth detecting body 36 is attached to the operation section 331A and arranged on the inside of the recessed portion 3512. The operation section 331A is a flat surface of the shaft section 331 on the tip side in the Z direction. The shaft section 331 is inserted into the hole portion 3411. At this time, the fifth detecting body 36 is arranged with a given clearance from the edge of the recessed portion 3512. Therefore, the operation section 35 and the fifth detecting body 36 do not interfere with each other even if the operation section 35 tilts relative to the shaft section 331.

The fifth detecting body 36 configured as described above includes the pressing operation section 361, a detection section 362, and a support section 363 as illustrated in FIGS. 5, 6, and 8. The pressing operation section 361 projects or retracts in the Z direction in response to the pressing by the user.

Of these, the support section 363 is fastened to the flat surface by the screws B to support the detection section 362 and the pressing operation section 361.

The pressing operation section 361 is supported by the support section 363 fastened to the operation section 331A in a manner free to project or retract along the Z direction. The pressing operation section 361 is directly operated by the user and retracts toward the root side in the Z direction in response to the pressing by the user, pressing the detection section 362 with a pressing section 3611 (FIGS. 5 and 6) that is provided to protrude on the inner surface of the pressing operation section 361. It should be noted that the pressing operation section 361 is biased toward the tip side in the Z direction by a biasing means not shown. If the pressing operation of the pressing operation section 361 is cancelled, the pressing operation section 361 returns to its initial position.

The detection section 362 corresponds to the detection section according to the present invention and includes a pressure-sensing element. The detection section 362 is connected to the controller described above. Then, when pressed by the pressing operation section 361, the detection section 362 outputs, to the controller, a signal indicating that the pressing operation section 361 has been pressed.

The fifth detecting body 36 configured as described above is attached to the end portion (operation section 331A) on the central axis of the shaft section 331 to which the operation section 35 is attached in a manner free to tilt. Therefore, when the main body section 33 is translated along the XY plane by the operation of the user, the fifth detecting body 36 translates together with the main body section 33 and the operation section 35 in the same direction. Similarly, when the main body section 33 is rotated about the rotational axis along the Z direction by the operation of the user, the fifth detecting body 36 rotates together with the main body section 33 and the operation section 35 in the same direction. However, the operation section 35 is attached to the shaft section 331 via the ring-shaped body 341 that functions as a gimbal. Therefore, if the operation section 35 is only rotated about the rotational axis along the XY plane (if the operation section 35 is only tilted relative to the shaft section 331), the shaft section 331 and the fifth detecting body 36 are not displaced. On the other hand, if only the pressing operation section 361 of the fifth detecting body 36 is pressed, the operation section 35 is not displaced. As described above, although sharing the shaft section 331, the operation section 35 and the fifth detecting body 36 can be displaced independently of each other and are involved in the detection of different displacement directions of the operation body 31.

[Configuration of the First Connecting Section]

The first connecting section 37 is attached to the second detecting body 44 to support the main body section 33. Further, the first connecting section 37 and the second connecting section 39 making up the tracking section 38 sandwich the second detecting body 44 along the Z direction as illustrated in FIGS. 5 and 9. The first connecting section 37 and the second connecting section 39 are connected together with the screws B. The first connecting section 37 is formed in the shape of an approximate letter L as seen from the X direction. The first connecting section 37 configured as described above includes a plate-shaped portion 371, the boss 372, an opening portion 373, and a standing section 374.

The plate-shaped portion 371 is arranged to extend along the XY plane as illustrated in FIGS. 5 and 6. The boss 372 is formed in an approximately cylindrical shape that projects toward the tip side in the Z direction from the approximate center of the face of the plate-shaped portion 371 opposed to the first detecting body 43. The boss 372 is fitted into the fitting section 332 formed in the main body section 33 from the root side in the Z direction. As a result, the main body section 33 is supported by the first connecting section 37 in a manner free to rotate about the rotational axis that extends along the Z direction.

The opening portion 373 is formed in an approximately oblong shape as seen from the Z direction as illustrated in FIGS. 7 and 9. The opening portion 373 is formed in such a manner as to penetrate the boss 372 along the Z direction. A displacement shaft 442 of the second detecting body 44 is fitted into the opening portion 373 as illustrated in FIGS. 5 and 6. As a result, the first connecting section 37 is attached to the second detecting body 44.

The standing section 374 stands from the end portion of the plate-shaped portion 371 on the tip side in the Y direction toward the root side in the Z direction. The threaded hole 375 (FIG. 5) is formed in the end face of the standing section 374 on the root side in the Z direction. The screw B is screwed in the threaded hole 375 to fasten the second connecting section 39. It should be noted that the standing section 374 is formed more on the tip side in the Y direction than the standing section 334 of the main body section 33 when the main body section 33 is attached to the boss 372. Therefore, the standing section 374 is located between the standing section 334 and the second detecting body 44 in the Y direction. In other words, the standing section 374 is formed closer to the second detecting body 44 than the standing section 334 as seen from the tip side in the Z direction. Then, the connection position between the standing section 334 and the third connecting section 40 which will be described later is more outward (farther apart from the second detecting body 44) than the connection position between the standing section 374 and the second connecting section 39 as seen from the tip side in the Z direction.

[Configuration of the Second Connecting Section]

The operation body 31 includes, in addition to the displacement section 32, the tracking section 38 adapted to track the displacement of the displacement section 32 (translational motion along the XY plane and rotational motion about the rotational axis that extends along the Z direction) as described earlier. The tracking section 38 includes the second and third connecting sections 39 and 40 and the third and fourth detecting bodies 41 and 42. The second connecting section 39 is connected to the first connecting section 37. The third connecting section 40 is connected to the main body section 33. The third and fourth detecting bodies 41 and 42 are attached to the third connecting section 40.

The second connecting section 39 is formed so that when assembled with the first connecting section 37, the second connecting section 39 is in the shape of an approximate horizontal letter U which sandwiches the second detecting body 44 as seen from the X direction as illustrated in FIGS. 5 and 9. When the main body section 33 is translated along the XY plane as a result of the operation of the operation section 35, the second connecting section 39 is translated in the same direction together with the first connecting section 37 that is connected to the main body section 33.

The second connecting section 39 configured as described above is formed in the shape of an approximate letter T as seen from the tip side in the Z direction. Then, the second connecting section 39 includes a hole portion 391, first and second bosses 392 and 393, and a contact section 394. The first and second bosses 392 and 393 serve as engagement sections.

The hole portion 391 is formed in the end portion of the second connecting section 39 on the tip side in the Y direction. The screw B is inserted into the hole portion 391 to fasten the second connecting section 39 to the first connecting section 37.

The first and second bosses 392 and 393 project from the end face of the second connecting section 39 on the root side in the Z direction. Of these, the first boss 392 is formed approximately at the center of the end face. The first boss 392 is inserted into a first opening portion 404 of the third connecting section 40 and fitted into a recessed portion 412 of a detection section 411 making up the third detecting body 41. On the other hand, the second boss 393 is inserted into a second opening portion 405 of the third connecting section 40. As a result, the range of rotational motion of the main body section 33 about the rotational axis along the Z direction is defined. Further, a biasing force is exerted on the second boss 393 by the biasing member 52 which will be described later. This biasing force brings the displacement section 32 back to its initial position, the position prior to the rotational motion, when the displacement section 32 is rotated about the rotational axis that extends along the Z direction.

The contact section 394 is formed at a position of the end face on the tip side in the Z direction appropriate to the position of the first boss 392. The contact section 394 is formed to swell from the tip side in the Z direction and comes in contact with a support section 443 of the second detecting body 44.

Here, the central axis of the first boss 392 coincides not only with that of the shaft section 331 but also with that of the displacement shaft 442 prior to the displacement on the second detecting body 44. Then, the contact section 394 is located on the central axis.

The second connecting section 39 having the contact section 394 configured as described above and the first connecting section 37 come into contact with the second detecting body 44 on the central axis to sandwich the second detecting body 44. This makes it possible for the first and second connecting sections 37 and 39 to stably sandwich the second detecting body 44 while at the same time being able to be displaced relative to the second detecting body 44. By extension, it is possible for the first connecting section 37 to stably support the main body section 33. Further, it is possible to reduce sliding resistance that occurs between the contact section 394 and the support section 443 of the second detecting body 44 when the second connecting section 39 is translated along the XY plane. In addition to the above, the fact that the contact section 394 is shaped to swell toward the second detecting body 44, and that the first and second connecting sections 37 and 38 are fastened by the screw B allows to accommodate the tolerance of the first and second connecting sections 37 and 39, and the second detecting body 44.

[Configuration of the Second Detecting Body]

The second detecting body 44 detects the translational motion of the operation body 31 along the XY plane as described earlier. The second detecting body 44 includes a detection section 441, the support section 443 and a wall section 444 (FIGS. 6 and 9), and a retaining section 445 (FIGS. 6 and 9) as illustrated in FIGS. 5, 6, and 9. The detection section 441 has the displacement shaft 442. The retaining section 445 has a fastening section 446 (FIG. 9).

The detection section 441 includes an orthogonal two-axis analog pad. The detection section 441 has the displacement shaft 442 that projects toward the tip side in the Z direction and is free to translate along the XY plane. The displacement shaft 442 is fitted into the opening portion 373 of the first connecting section 37. As a result, as the displacement section 32 translates along the XY plane, the displacement shaft 442 is translated in the same direction. The direction of motion of the displacement shaft 442 is detected by the detection section 441. Then, the detection section 441 outputs, to the controller, a signal indicating the direction of motion of the displacement shaft 442.

The support section 443 supports the detection section 441. The arc-shaped wall section 444 is formed on the support section 443. The arc-shaped wall section 444 surrounds the detection section 441 except on the tip side in the Y direction. The plate-shaped portion 371 is arranged on the inside of the wall section 444 via a given clearance.

The retaining section 445 is formed in the shape of an arc matching the wall section 444 and fastened to the wall section 444 with the screw B. The retaining section 445 retains the detection section 441 that is placed on the support section 443 from the tip side in the Z direction, thus fastening the detection section 441. The fastening section 446 is formed in the end face of the retaining section 445 on the tip side in the Z direction. The fastening section 446 is a threaded hole in which the screw B is screwed to fasten the first detecting body 43. It should be noted that the first and second detecting bodies 43 and 44 fastened by the screw B to each other are fastened to given areas in the exterior enclosure 2.

[Configuration of the Third Connecting Section]

In addition to being connected to the main body section 33 and displaced together with the main body section 33, the third connecting section 40 supports the third detecting body 41. The third connecting section 40 includes a hole portion 401 (FIGS. 5 and 9), a fastening section 402 (FIGS. 5 and 9), positioning holes 403 (FIG. 9), the first opening portion 404, the second opening portion 405 (FIGS. 5 and 9), and a hook-shaped portion 406 (FIG. 9) as illustrated in FIGS. 5, 6, and 9. The hole portion 401 is formed in the third connecting section 40 on the tip side in the Y direction. The screw B is inserted into the hole portion 401 to fasten the third connecting section 40 to the standing section 334 of the main body section 33.

The fastening section 402 is formed as a threaded hole. The screw B is screwed in the fastening section 402 to fasten the third detecting body 41 to the third connecting section 40. The third detecting body 41 is attached to the third connecting section 40 from the root side in the Z direction.

Projecting portions 413, formed in the third detecting body 41, are inserted into the positioning holes 403. As a result, the third detecting body 41 is positioned on the third connecting section 40.

The first opening portion 404 and the second opening portion 405 penetrate the third connecting section 40 along the Z direction. Of these, the first opening portion 404 is formed approximately at the center of the third connecting section 40 in an approximately circular shape as seen from the Z direction as illustrated in FIG. 9. The first boss 392 is inserted into the recessed portion 412 of the third detecting body 41 via the first opening portion 404. Further, the second opening portion 405 is formed in the third connecting section 40 on the root side in the Y direction in an approximately rectangular shape as seen from the Z direction. The second boss 393 is inserted into the second opening portion 405.

The hook-shaped portion 406 is formed in the shape of an approximate letter L that extends from the end portion of the third connecting section 40 on the root side in the Y direction toward the root side in the Z direction first and then extends toward the tip side in the Y direction. A support section 414 of the third detecting body 41 is fitted into the hook-shaped portion 406.

[Configuration of the Third Detecting Body]

The third detecting body 41 detects the rotational motion of the operation body 31 about the rotational axis that extends along the Z axis. That is, the third detecting body 41 detects the rotational motion of the third connecting section 40 that rotates as it tracks the displacement section 32 when the operation section 35 and/or the pressing operation sections 361 and 421 are rotated by the user about the rotational axis that extends along the Z direction. The third detecting body 41 includes the detection section 411 and the support section 414 as illustrated in FIGS. 5 and 9.

The detection section 411 includes a potentiometer and has the recessed portion 412 into which the first boss 392 of the second connecting section 39 is fitted. The detection section 411 detects the rotational angle of the third detecting body 41 that rotates about the rotational axis that extends along the Z direction together with the displacement section 32 (rotational angle of the second connecting section 39 that does not rotate about the rotational axis that extends along the Z direction with respect to the first boss 392). As a result, the detection section 411 detects the direction of rotational motion of the operation body 31. Then, the detection section 411 outputs, to the controller, a signal indicating the detected direction of rotational motion of the operation body 31.

It should be noted that the projecting portions 413 (FIG. 9) are provided to protrude on the end face of the detection section 411 on the tip side in the Z direction. The projecting portions 413 are inserted into the positioning holes 403.

The support section 414 supports the detection section 411 from the root side in the Z direction. A hole portion 415 is formed in the support section 414 on the tip side in the Y direction. The screw B is inserted into the hole portion 415 to fasten the third detecting body 41 to the third connecting section 40.

Further, locking sections 416 (FIG. 9) are provided to protrude, one at each end in the X direction, near the end portion of the support section 414 on the root side in the Y direction. Each of the locking sections 416 locks one end of the biasing member 52.

[Configuration of the Biasing Member]

The biasing member 52 exerts a biasing force in the direction opposite to the direction of rotational motion of the third connecting section 40 when the displacement section 32 and the third connecting section 40 are rotated about the rotational axis that extends along the Z direction, thus bringing the displacement section 32, and, by extension, the operation body 31, back to their initial positions. In the present embodiment, the biasing member 52 is provided between the third connecting section 40 and the third detecting body 41 as illustrated in FIGS. 5 and 9. The biasing member 52 includes two compression springs 521 that engage with the second boss 393 projecting toward the third detecting body 41 via the second opening portion 405. These compression springs 521 are arranged in series in the X direction. The end portions of the compression springs 521 close to each other are in contact with the outer perimeter surface of the second boss 393. The end portions of the compression springs 521 far from each other are locked by the locking sections 416.

Then, when the third connecting section 40 is rotated about the rotational axis that extends along the Z direction (central axis of the first boss 392), each of the locking sections 416 of the third detecting body 41 fastened to the third connecting section 40 compresses one of the compression springs 521 one of whose ends is locked by the second boss 393. The compression springs 521 exert a biasing force on the locking sections 416 in the direction opposite to the direction of rotational motion of the third connecting section 40 and the third detecting body 41. Therefore, when the rotational motion operation of the operation body 31 (displacement section 32) is cancelled, the third connecting section 40 and the third detecting body 41 return to the positions prior to the movement because of the biasing force, bringing the operation body 31 back to its initial position. The same holds true when the operation body 31 is rotated in the opposite direction.

It should be noted that although, in the present embodiment, the biasing member 52 includes the two compression springs 521, tension springs may be used in place of the compression springs. Alternatively, the biasing member may include an elastic body such as rubber.

[Configuration of the Fourth Detecting Body]

The fourth detecting body 42 includes the pressing operation section 421 and detects the pressing operation of the pressing operation section 421 by the user toward the tip side in the Z direction. The fourth detecting body 42 includes a detection section 422 in addition to the pressing operation section 421 as illustrated in FIGS. 5, 6, and 9. The detection section 422 is pressed by the pressing operation section 421.

Of these, the detection section 422 includes a pressure-sensing element. Then, the detection section 422 is arranged so that the pressure-sensing surface thereof faces the face of the support section 414 of the third detecting body 41 on the root side in the Z direction. The pressing operation section 421 functions as a third operation section of the operator 3. The pressing operation section 421 is formed in an approximately cylindrical shape. Although not illustrated in detail, the pressing operation section 421 is provided on the support section 414 with the detection section 422 sandwiched between the pressing operation section 421 and the support section 414 in a manner free to project or retract along the Z direction.

With the fourth detecting body 42 configured as described above, when the pressing operation section 421 is pressed toward the tip side in the Z direction, the detection section 422 is pressed by a pressing section 4211 provided to protrude approximately at the center of the inner surface of the pressing operation section 421. Then, the detection section 422 detects the pressing force exerted by the pressing section 4211 and outputs, to the controller, a signal indicating that the pressing operation section 421 has been pressed.

It should be noted that a biasing force is exerted by a biasing member not shown on the pressing operation section 421 toward the root side in the Z direction. When the pressing operation toward the tip side in the Z direction is cancelled, the pressing operation section 421 is brought back to its initial position by the biasing force.

[Detection of the Direction of Operation of the Operation Body]

With the operator 3 configured as described above, the user's operation on the operation body 31 is detected in the following manner.

The translational motion operation of the operation body 31 along the XY plane is accomplished, for example, by pinching the operation section 35 with the thumb and other finger, or pinching the pressing operation sections 361 and 421 with the thumb and other finger and moving these fingers along the XY plane. As a result, a force acts on the shaft section 331 via the operation section 35 or on the shaft section 331 having the operation section 331A via the pressing operation section 361. This force acts on the displacement shaft 442 provided on the detection section 441 of the second detecting body 44 via the main body section 33 having the shaft section 331 and the first connecting section 37 attached to the main body section 33 as illustrated in FIGS. 5 and 6. The second detecting body 44 detects the translational motion of the operation body 31 along the XY plane as the detection section 441 detects the direction of motion of the displacement shaft 442.

During this translational motion, the tracking section 38 connected to the displacement section 32 is translated in the same direction together with the displacement section 32.

The rotational motion operation of the operation section 35 about the rotational axis that extends along the XY plane, i.e., the rotational motion operation (tilting operation) of the operation section 35 about the rotational axis, is accomplished, for example, by bringing the thumb or other finger in contact with the face 351A of the operation section 35 and pressing a given position of the operation section 35 with the finger toward the root side in the Z direction. The force (pressing force) acting on the operation section 35 is exerted on the pressure-sensing element 433 of the first detecting body 43. The shaft section 331 to which the operation section 35 is attached is inserted into the first detecting body 43, and the first detecting body 43 is pressed by the projecting portion 3517 via the presser 512. Then, the displacement direction of the operation section 35 is detected as the first detecting body 43 detects that the pressure-sensing element 433 is being pressed.

At this time, the operation section 35 is provided in a manner free to tilt independently of the shaft section 331. Therefore, the shaft section 331 does not tilt together with the operation section 35. As a result, the main body section 33 of the displacement section 32, the fifth detecting body 36, the first connecting section 37, the tracking section 38, the first and second detecting bodies 43 and 44, and the biasing member 52 do not displace themselves.

The rotational motion operation of the operation section 35 and/or the pressing operation sections 361 and 421 about the rotational axis that extends along the Z direction is accomplished, for example, by pinching the operation section 35 with the thumb and other finger and rotating the operation section 35 with these fingers in such a manner as to twist the operation section 35, or pinching the pressing operation sections 361 and 421 with the thumb and other finger and rotating the wrist. The force (rotational force) acting on the operation section 35 and the operation section 331A is exerted on the third detecting body 41 via the main body section 33 and the third connecting section 40. More specifically, when the main body section 33 is rotated as a result of the rotational motion of the operation section 35 and/or the pressing operation sections 361 and 421, the third connecting section 40 connected to the main body section 33 and the third detecting body 41 attached to the third connecting section 40 are rotated in the same direction as illustrated in FIGS. 5 and 6. Here, the main body section 33 is attached to the first connecting section 37 in a manner free to rotate about the rotational axis that extends along the Z direction. Therefore, the first and second connecting sections 37 and 39 do not rotate in the same direction as the main body section 33. Therefore, the third detecting body 41 rotates about the central axis of the first boss 392 together with the displacement section 32 with the first boss 392 inserted into the recessed portion 412 of the third detecting body 41. Then, the displacement direction (rotational direction) of the operation section 35 and/or the pressing operation sections 361 and 421 is detected as the detection section 411 of the third detecting body 41 detects the rotational angle (rotational direction) relative to the first boss 392.

The translational motion operation (pressing operation) of the operation body 31 toward the root side in the Z direction is detected by the fifth detecting body 36 instead. Further, the translational motion operation (pressing operation) of the operation body 31 toward the tip side in the Z direction is detected by the fourth detecting body 42 instead.

That is, in the present embodiment, the translational motion of the operation body 31 along the Z direction is not permitted. Therefore, whether the operation has been made by the user to translate the operation body 31 along the Z direction is detected by detecting the pressing (retraction) of the pressing operation sections 361 and 421 making up the fifth and fourth detecting bodies 36 and 42, respectively, with the detection sections 362 and 422.

More specifically, the pressing operation by the user toward the root side in the Z direction is detected as the detection section 362 detects whether the detection section 362 has been pressed by the pressing operation section 361 that is directly pressed by the user as illustrated in FIGS. 5 and 6. Further, the pressing operation by the user toward the tip side in the Z direction is detected as the detection section 422 detects whether the detection section 422 has been pressed by the pressing operation section 421 that is directly pressed by the user.

As described above, the operator 3 is configured as a six-axis sensor. It should be noted that although the operations of the operation section 35 and the pressing operation sections 361 and 421 have been described individually above, these operations, even if performed in combination, are similarly detected by the detecting bodies 36 and 41 to 44.

It should be noted that, in the present embodiment, of the first, second, and third detecting bodies 43, 44, and 41, the first detecting body 43 is the closest to the operation sections 35 and 331A. The first detecting body 43 detects the rotational motion of the operation section 35 about the rotational axis that extends along the XY plane.

That is, only the pressing body 51 is provided between the operation section 35 and the first detecting body 43. The other detecting bodies 41 and 44 do not lie therebetween. Therefore, the distance from the operation sections 35 and 331A to the detection section 432 of the first detecting body 43 is the shortest. The distance from the operation sections 35 and 331A to the detection section 441 of the second detecting body 44 is longer than the above distance. Then, the distance from the operation sections 35 and 331A to the detection section 411 of the third detecting body 41 is the longest.

The operating device 1 according to the embodiment described above offers the following advantageous effects. The first detecting body 43 can detect, for example, the rotational motion (tilting relative to the shaft section 331 which is a rotational motion along two orthogonal axes) of the operation body 31 about the rotational axis that extends along the XY plane (plane defined by the second and third directions in the present invention). This rotational motion is accomplished as the user presses the operation section 35 with a finger. Further, the second detecting body 44 can detect, for example, the translational motion (translational motion along two orthogonal axes) of the operation body 31 along the XY plane. This translational motion is accomplished as the user pinches the operation section 35 and/or the pressing operation sections 361 and 421 with fingers. This makes it possible to detect the displacement of the single operation body 31 along four axes. Therefore, it is possible to detect more operation directions (displacement directions) of the operation body 31 than with a conventional analog stick.

Further, the first and second detecting bodies 43 and 44 are provided independently of each other. This keeps to a minimum erroneous detection of the rotational motion operation of the operation section 35 about the rotational axis that extends along the XY plane by the second detecting body 44 adapted to detect the translational motion operation along the XY plane. Similarly, this keeps to a minimum erroneous detection of the translational motion operation of the operation section 35 and/or the pressing operation sections 361 and 421 along the XY plane by the first detecting body 43 adapted to detect the rotational motion operation. Therefore, it is possible to provide improved reliability in detection of the displacement direction of the operation body 31 by the detecting bodies 43 and 44. In addition to the above, it is possible to simplify the processing of detection results of the detecting bodies 43 and 44 handled by the controller.

The operation body 31 includes the operation section 35 that spreads outward in the direction of diameter of the shaft section 331 of the main body section 33. This provides a larger area with which the user's finger, for example, comes in contact, thus contributing to greater ease of use of the displacement section 32. Further, the operation section 35 is provided on the shaft section 331 in a manner free to rotate about the rotational axis that extends along the XY plane (free to tilt). In the case of the rotational motion operation (tilting operation) of the operation section 35 about the rotational axis that extends along the XY plane, therefore, the operation section 35 displaces itself, but not the shaft section 331. In the case of only the translational motion operation of the operation section 35 and/or the pressing operation sections 361 and 421 along the XY plane, on the other hand, the operation section 35 and the shaft section 331 translate in the same direction.

This permits the rotational motion operation of the operation section 35 about the rotational axis that extends along the XY plane and the translational motion operation of the operation section 35 and/or the pressing operation sections 361 and 421 along the XY plane independently of each other. Further, the above rotational motion operation and the translational motion operation can be detected independently by the first and second detecting bodies 43 and 44, respectively. This contributes to improved ease of use of the operator 3 and improved detection accuracy of the displacement direction of the operation body 31 by the first and second detecting bodies 43 and 44.

Here, when the operation section 35 is fastened to the shaft section 331, and when the shaft section 331 rotates about the rotational axis that extends along the XY plane together with the operation section 35, the operation section 35 does not tilt relative to the shaft section 331 unless the operation section 35 and the shaft section 331 displace themselves significantly. This leads to poor ease of use of the operation body 31. In order to provide improved ease of use, on the other hand, it is necessary to provide a space that permits a large tilt of the operation section 35 and the shaft section 331, thus resulting in upsizing of the operator 3.

In contrast, provision of the operation section 35 on the shaft section 331 in a manner free to tilt makes it possible to tilt the operation section 35 relative to the shaft section 331 to a large degree with a small amount of displacement. This provides improved ease of use of the operation body 31. In addition, the range of displacement (range of tilt) of the operation section 35 is smaller than in the case described above, thus allowing for downsizing of the operator 3. Further, the operation section 35 and the first detecting body 43 adapted to detect the tilting of the operation section 35 can be arranged comparatively close to each other, thus allowing for further downsizing of the operator 3.

The operation body 31 has the operation section 331A that is a flat surface located on the central axis of the shaft section 331 and that serves as a second operation section that can be operated by the user. The operation section 331A is located inside the operation section 35 as seen from the tip side in the Z direction that extends along the central axis of the shaft section 331. The operation section 35 serves as a first operation section that is provided on the shaft section 331 in a manner free to tilt.

This makes it possible to reliably translate the shaft section 331, and by extension, the operation body 31, along the XY plane without tilting the operation section 35 relative to the shaft section 331. Therefore, the rotational motion of the operation body 31 about the rotational axis that extends along the XY plane and the translational motion of the operation body 31 along the XY plane can be reliably and independently achieved. This keeps to a minimum erroneous detection of the rotational motion of the operation body 31 about the rotational axis that extends along the XY plane by the first detecting body 43 during the translational motion of the operation body 31 along the XY plane.

The operator 3 has the fifth detecting body 36 that is provided on the operation section 331A and detects the pressing operation along the Z axis (pressing operation toward the root side in the Z direction) by the user. This makes it possible to detect the pressing operation along the Z axis by the user even if the translational motion of the operation body 31 along the Z axis is not permitted. Therefore, it is possible to provide more displacement directions of the operation body that can be detected by the operator 3, thus contributing to further improved convenience and versatility of the operator 3.

At least the three projecting portions 3517 (four projecting portions 3517 in the present embodiment) are provided on the operation section 35. The projecting portions 3517 extend along the Z direction (first direction in the present invention) and are provided equidistantly along the circumference of the shaft section 331. Further, the pressure-sensing elements 433 are provided on the base section 431 of the first detecting body 43 at positions appropriate to those of the projecting portions 3517. This ensures that the pressing force exerted by at least one of the projecting portions 3517 is transferred to the pressure-sensing element 433 when the operation section 35 is operated to rotate (tilt) about the rotational axis that extends along the XY plane. As a result, it is possible for the first detecting body 43 to reliably detect the displacement direction (rotational direction) of the operation section 35 based on the pressed condition of each of the pressure-sensing elements 433. Therefore, it is possible to detect the displacement direction of the operation body 31 with a comparatively simple configuration and provide improved reliability in detecting the displacement direction.

The projecting portions 3517 are provided on the operation section 35 in a manner free to project toward or retract from the first detecting body 43. Further, the operation section 35 has the biasing members 3516 each of which biases one of the projecting portions 3517 toward the first detecting body 43.

Here, if the operation section 35 is rotated (tilted) about the rotational axis that extends along the XY plane, the projecting portion 3517 retracts into the arrangement section 3515 of the operation section 35 while at the same time exerting a pressing force on the pressure-sensing element 433. In response to the retraction of the projecting portion 3517, the biasing member 3516 inside the arrangement section 3515 exerts a biasing force on the projecting portion 3517 toward the first detecting body 43. Therefore, when the rotational motion operation of the operation section 35 is cancelled, the projecting portion 3517 attempts to return to its previous position because of the biasing force. As a result, the operation section 35 returns to its initial position prior to its tilting, thus contributing to improved ease of use of the operator 3.

On the other hand, if the projecting portions 3517 are formed with a rigid material, direct pressing of the pressure-sensing element 433 by the projecting portion 3517 may damage the pressure-sensing element 433 due to the pressing force of the projecting portion 3517. A possible solution to this would be to form the projecting portions 3517 with elastic bodies. However, the projecting portions 3517 bend and deform depending on their shape. Therefore, the pressure-sensing elements 433 may not be able to properly detect the pressing forces exerted by the projecting portions 3517. For example, when the operation section 35 is operated to rotate about the rotational axis that extends along the XY plane, increasing the pressing force exerted on the operation section 35 with time causes the projecting portion 3517 to bend and deform at a given time if the projecting portion 3517 is formed in the shape of a pin. Therefore, the pressure-sensing element 433 may not be able to detect the change in pressing force properly.

In contrast, the presser 512 formed with an elastic body in the form of a flat plate is provided between the projecting portion 3517 and the pressure-sensing element 433. This keeps to a minimum possible damage to the pressure-sensing element 433 even when the rotational motion operation is performed. In addition, the presser 512 does not bend or deform, thus making it possible for the pressure-sensing element 433 to properly detect the pressing force of the operation section 35. This contributes to improved accuracy in detecting the displacement direction of the first detecting body 43. Further, a given clearance is provided between the projecting portion 3517 and the associated presser 512. As a result, the range of detection (so-called play) during tilting of the operation section 35 can be adjusted by adjusting the clearance. This contributes to improved ease of use of the operator 3.

The second detecting body 44 supports the main body section 33 having the shaft section 331 in a manner free to translate along the XY plane. As a result, it is possible to reliably transfer the translational motion of the operation body 31 along the XY plane to the second detecting body 44. Therefore, the second detecting body 44 can reliably detect the translational motion of the operation body 31.

The operator 3 includes, in addition to the first and second detecting bodies 43 and 44, the third detecting body 41 adapted to detect the rotational motion of the operation body 31 (the displacement section 32 and the third connecting section 40) about the rotational axis that extends along the Z direction. This makes it possible to detect more displacement directions of the operation body 31 using the third detecting body 41. Therefore, it is possible to provide further improved convenience and versatility of the operator 3. Further, the third detecting body 41 is provided independently of the first and second detecting bodies 43 and 44, thus contributing to further improved accuracy in detecting the rotational motion of the operation body 31 about the rotational axis that extends along the Z direction.

Still further, the second detecting body 44 is connected to the main body section 33 having the shaft section 331 via the first connecting section 37, and the third detecting body 41 is connected to the main body section 33 via the third connecting section 40. This makes it easy for the second and third detecting bodies 44 and 41 to detect the translational motion of the shaft section 331 along the XY plane and the rotational motion of the shaft section 331 about the rotational axis that extends along the Z direction. Therefore, it is possible to provide further improved accuracy in detecting the displacement direction of the operation body 31.

The operation body 31 includes the first, second, and third connecting sections 37, 39, and 40. Of these, the first connecting section 37 is attached to the second detecting body 44 to support the main body section 33 having the shaft section 331 in a manner free to rotate about the rotational axis that extends along the Z direction. The shaft section 331 is inserted into the hole portions 4311 and 4321 of the first detecting body 43. Further, the second connecting section 39 is connected to the first connecting section 37, thus pinching the second detecting body 44. Still further, the third connecting section 40 is connected to the extension section 333 by the standing section 334. The extension section 333 extends from the shaft section 331 in the main body section 33. The third connecting section 40 is located on the opposite side of the second detecting body 44 relative to the second connecting section 39. The third detecting body 41 is attached to the third connecting section 40 on the opposite side of the second connecting section 39.

The connection area between the third connecting section 40 and the main body section 33 is located on the outside of the connection area between the first and second connecting sections 37 and 39 when the operator 3 is seen along the Z direction. Further, the main body section 33 is attached to the first connecting section 37 in a manner free to rotate about the rotational axis that extends along the Z direction. Still further, the second connecting section 39 has the first boss 392, an engagement section that is inserted into the first opening portion 404 of the third connecting section 40 to engage with the third detecting body 41. Then, the third connecting section 40 and the third detecting body 41 rotate about the rotational axis that extends along the Z direction together with the operation section 35. The detection section 411 of the third detecting body 41 detects the direction of rotational motion of the third detecting body 41 relative to the first boss 392.

That is, the first connecting section 37 arranged between the first and second detecting bodies 43 and 44 not only is attached to the second detecting body 44 but also supports the main body section 33 having the shaft section 331 in a manner free to rotate. The shaft section 331 is inserted into the first detecting body 43. Therefore, the rotational motion of the operation body 31 about the rotational axis that extends along the Z direction is not transferred to the second detecting body 44. This not only keeps the second detecting body 44 free from load due to the rotational motion of the operation body 31 but also keeps to a minimum erroneous detection of the displacement direction by the second detecting body 44.

Further, the first connecting section 37 is connected to the second connecting section 39 to sandwich the second detecting body 44 as described above. Then, the third connecting section 40 is connected to the main body section 33 on the outside of the first and second connecting sections 37 and 39. The third connecting section 40 rotates about the rotational axis that extends along the Z direction together with the displacement section 32. However, the displacement section 32 and the third connecting section 40 rotate independently of the first and second connecting sections 37 and 39. This prevents the first and second connecting sections 37 and 39 from interfering with the rotational motion of the displacement section 32.

Further, the third detecting body 41 is attached to the third connecting section 40. On the other hand, the second connecting section 39 that does not rotate together with the displacement section 32 has the first boss 392, an engagement section that is fitted into the recessed portion 412 of the third detecting body 41. This makes it possible for the third detecting body 41 to reliably detect the direction of rotational motion of the operation section 35 about the rotational axis that extends along the Z direction, and, by extension, the direction of rotational motion of the operation body 31 by detecting the rotational angle of the third detecting body 41 relative to the first boss 392.

At this time, if the operation section 35 is operated only to rotate about the rotational axis that extends along the Z direction, the displacement of the operation section 35 is not transferred to the first and second detecting bodies 43 and 44. Therefore, the displacement of the operation section 35 is not detected by the detecting bodies 43 and 44. Therefore, it is possible to keep to a minimum redundant detection of the displacement of the operation section 35 by the detecting bodies 41, 43, and 44, contributing to further simpler processing of detection results as described above.

Further, the second detecting body 44 has an orthogonal two-axis analog pad. The third detecting body 41 has a potentiometer. This not only provides ease of use and operational sensation similar to those of a conventional operating device but also allows to form the operator 3 at a relatively low cost because the configuration of the operating device can be used.

The operator 3 has the fourth detecting body 42 that is provided on the opposite side of the third connecting section 40 on the third detecting body 41. The fourth detecting body 42 detects the pressing operation along the Z direction (pressing operation toward the tip side in the Z direction) by the user. This makes it possible to detect the pressing operation of the pressing operation section 421 of the fourth detecting body 42 instead of the translational motion of the operation body 31 in the same direction even as does the fifth detecting body 36 even if the translational motion of the operation body 31 along the Z direction is restricted. Therefore, it is possible to provide more displacement directions that can be detected by the operator 3, thus contributing to further improved convenience and versatility of the operator 3.

[Second Embodiment]

A description will be given next of a second embodiment of the present invention.

The operating device according to the present embodiment has a similar configuration to that of the operating device 1 described above but differs therefrom in structure of the operator used. It should be noted that, in the description given below, the same or approximately the same components as those described earlier will be denoted by the same reference symbols and the description thereof will be omitted.

Figure 10:
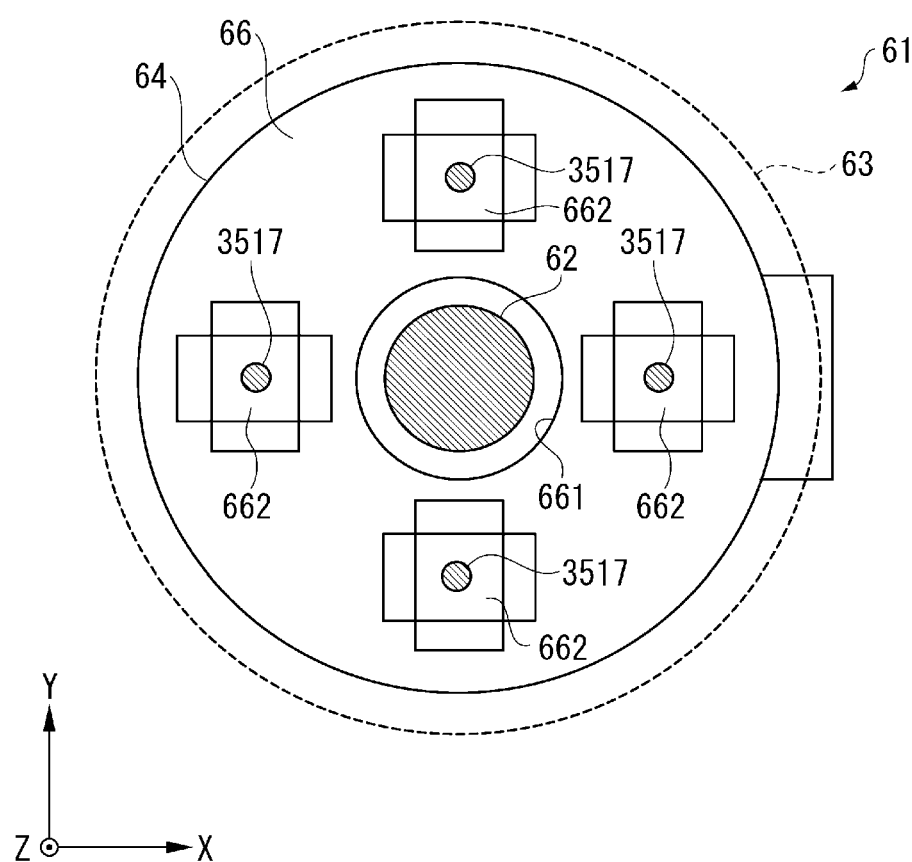
FIG. 10 is a plan view illustrating major components of an operator of an operating device according to a second embodiment of the present invention.
Figure 11:
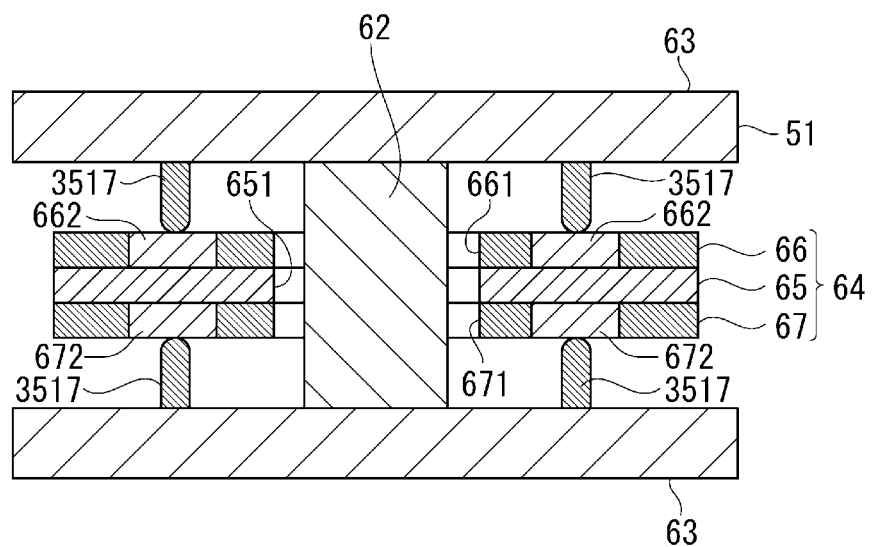
FIG. 11 is a cross-sectional view illustrating the operator according to the second embodiment.

FIGS. 10 and 11 are a plan view and a cross-sectional view along the XZ plane illustrating major components of an operator 3A of the operating device according to the present embodiment.

The operating device according to the present embodiment has the same configuration and functions as the operating device 1 except that it has the operator 3A rather than the operator 3.

The operator 3A is configured as a six-axis sensor and includes an operation body 61 and a detecting body 64 as illustrated in FIGS. 10 and 11. The detecting body 64 detects the displacement direction of the operation body 61.

The operation body 61 is displaced in response to input operation by the user. The operation body 61 includes a shaft section 62 and a pair of operation sections 63. The shaft section 62 is in an approximately cylindrical shape along the Z direction. The operation sections 63 are provided, one on the tip side and another on the root side of the shaft section 62 in the Z direction. Of these, each of the operation sections 63 is formed in an approximately circular shape as seen from the Z direction and provided in such a manner as to cover one of the faces of the detecting body 64 on the tip or root side in the Z direction. Although having the same configuration as the operation section 35 described above, each of these operation sections 63 is attached to the shaft section 62 without using the attachment member 34. Therefore, the shaft section 62 and the operation sections 63 are displaced (translated and rotated) in the same direction when the operation body 61 is displaced.

The four projecting portions 3517 protrude equidistantly along the outer perimeter of the operation sections 63 configured as described above on the face of the operation sections 63 that are opposed to the detecting body 64. The four projecting portions 3517 are biased by the biasing members 3516 toward the detecting body 64 side. These projecting portions 3517 are provided in such a manner as to be constantly in contact with pressure-sensing elements 662 and 672 of the detecting body 64 associated with the projecting portions 3517 before the operation body 61 is displaced.

The detecting body 64 detects the rotational motion of the operating body 61 about the rotational axis that extends along the XY plane, the rotational motion thereof about the rotational axis along the Z direction, the translational motion thereof along the XY plane, and the translational motion thereof along the Z direction. This detecting body 64 is sandwiched between the pair of operation sections 63. The detecting body 64 configured as described above includes a base section 65 (FIG. 1), a first detection section 66 (FIGS. 10 and 11), and a second detection section 67 (FIG. 11). The base section 65 is in the shape of a flat plate. The first detection section 66 is arranged on the face of the base section 65 on the tip side in the Z direction. The second detection section 67 is arranged on the face of the base section on the root side in the Z direction.

A hole portion 651 is formed approximately at the center of the base section 65. The shaft section 62 is inserted into the hole portion 651.

The first detection section 66 is formed in an approximately annular shape as seen from the tip side in the Z direction as illustrated in FIG. 10. The same is true for the second detection section 67. Hole portions 661 and 671 are formed approximately at the centers of the first and second detection sections 66 and 67 as illustrated in FIG. 11. The shaft section 62 is inserted into the hole portions 661 and 671.

Further, the pressure-sensing elements 662 and 672 are arranged at positions of the first and second detection sections 66 and 67 matching those of the projecting portions 3517. That is, the four pressure-sensing elements 662 of the first detection section 66 and the four pressure-sensing elements 672 of the second detection section 67 are arranged equidistantly along the circumference of the shaft section 62 (or the operation section 63).

It should be noted that, in the present embodiment, each of the pressure-sensing elements 662 of the first detection section 66 and each of the pressure-sensing elements 672 of the second detection section 67 are arranged at the overlapping positions with each other as seen from the tip side in the Z direction. However, the present invention is not limited thereto, and each of the pressure-sensing elements 662 and each of the pressure-sensing elements 672 may be arranged at non-overlapping positions. In this case, it is only necessary to set the positions of the projecting portions 3517 of the operation sections 63 on the tip and root sides in the Z direction in accordance with the positions of the corresponding pressure-sensing elements 662 and 672.

The pressure-sensing elements 662 and 672 detect not only the pressing forces exerted by the projecting portions 3517 but also the pressed positions (coordinates) of the approximately rectangular pressure-sensing surfaces of the pressure-sensing elements 662 and 672. Therefore, the first and second detection sections 66 and 67 can detect the loci of the positions pressed by the projecting portions 3517 using the pressure-sensing elements 662 and 672. As described earlier, the associated projecting portion 3517 is constantly in contact with each of the pressure-sensing elements 662 and 672 configured as described above. Then, each of the detection sections 66 and 67 outputs, to the control section described above, detection results obtained respectively by their pressure-sensing elements 662 and 672.

The operator 3A described above detects the displacement of the operation body 61 in the following manner. The rotational motion of the operation body 61 about the rotational axis that extends along the XY plane is detected by the fact that the pressing force exerted by the projecting portion 3517 detected by at least one of the four pressure-sensing elements 662 increases and that the pressing force exerted by the projecting portion 3517 detected by one of the four pressure-sensing element 672 on the opposite side of the pressure-sensing element 662 with the hole portion 671 therebetween increases. That is, it is possible to detect the direction of rotational motion of the operation body 61 by determining the positions of the pressure-sensing elements 662 and 672 which detect higher pressing forces.

It should be noted that the direction of rotational motion of the operation body 61 can be detected by the pressure-sensing element of one of the first and second detection sections 66 and 67 alone. Alternatively, the direction of rotational motion of the operation body 61 may be detected based on the positions of the pressure-sensing elements 662 and 672 which detect lower pressing forces.

The rotational motion of the operation body 61 about the rotational axis that extends along the Z direction is detected as each of the pressure-sensing elements 662 and 672 pressed by the projecting portions 3517 detects the locus of displacement of the projecting portion 3517 along the circumference of the hole portion 661 or 671. The translational motion of the operation body 61 along the XY plane is detected as each of the pressure-sensing elements 662 and 672 detects the displacement of the projecting portion 3517 in the same direction. In the case of the translational motion of the operation body 61 toward the tip side in the X direction, for example, the direction of displacement of the operation body 61 is detected based on the fact that the loci of displacement of the projecting portions 3517 detected by the pressure-sensing elements 662 and 672 all point in the same direction.

It should be noted that the direction of rotational motion of the operation body 61 about the rotational axis that extends along the Z direction and the direction of translational motion of the operation body 61 along the XY plane can be detected by the pressure-sensing element of one of the first and second detection sections 66 and 67 alone.

The translational motion of the operation body 61 along the Z direction can be detected by the fact that the pressing force exerted by the projecting portion 3517 detected by the pressure-sensing element of one of the first and second detection sections 66 and 67 increases. In the case of the translational motion of the operation body 61 toward the root side in the Z direction, for example, the direction of displacement of the operation body 61 is detected by the fact that the pressing force detected by each of the pressure-sensing elements 662 of the first detection section 66 after the translational motion of the operation body 61 is larger than that detected before the translational motion. In the case of the translational motion of the operation body 61 toward the tip side in the Z direction, the direction of displacement of the operation body 61 is similarly detected by the fact that the pressing force detected by each of the pressure-sensing elements 672 of the second detection section 67 after the translational motion of the operation body 61 is larger.

It should be noted that the direction of displacement of the operation body 61 can be detected based on the fact that the pressing force detected by each of the pressure-sensing elements of one of the first and second detection sections 66 and 67 decreases.

The operating device according to the present embodiment described above provides advantageous effects similar to those of the operating device 1.

[Modifications of the Embodiments]

The present invention is not limited to the above embodiments. Modifications, improvements and so on made to an extent which allows the object of the present invention to be achieved are included in the present invention.

In the first embodiment, the operation body 31 has the operation section 35. The operation section 35 is provided on the tip side of the shaft section 331 in the Z direction in a manner free to tilt and spreads outward in the direction of diameter of the shaft section 331. However, the present invention is not limited thereto. That is, the operation section 35 may be fastened to the shaft section 331 so long as the direction of displacement of the operation body 31 (displacement section 32) can be properly detected by the first and second detecting bodies 43 and 44. That is, the operation section 35 need not be attached to the shaft section 331 in a manner free to tilt. Further, the operation section 35 need not be provided if the above operations can be made on the fifth detecting body 36 or the main body section 33.

In each of the above embodiments, a biasing force is exerted on the projecting portions 3517 by the biasing members 3516 to bring the operation body 31 back to its initial position. However, the present invention is not limited thereto. That is, the operation body 31 may be brought back to its initial position by other configuration. For example, a spring may be provided between the operation section 35 and the pressing body 51.

In the first embodiment, a clearance is provided between the projecting portions 3517 and the pressers 512. However, the present invention is not limited thereto. That is, the projecting portions 3517 may be in contact with the pressers 512 before the operation body 31 (displacement section 32) is operated.

In the first embodiment, the first, second, and third detecting bodies 43, 44, and 41 are arranged in sequence from the operation section 35 toward the root side in the Z direction. However, the present invention is not limited thereto. That is, the sequence of these detecting bodies may be changed. Alternatively, the fourth and fifth detecting bodies 42 and 36 may be omitted. Still alternatively, if any of the first, second, and third detecting bodies 43, 44, and 41 has an equivalent function (detection of the pressing operation along the Z direction), the configuration may be replaced by that detecting body. Still alternatively, the positions of the fourth and fifth detecting bodies 42 and 36 may be changed as appropriate. For example, the shaft section 331 may include two members, and a pressure-sensing element may be provided on the end portion of one of the members so that the pressure-sensing element is pressed by the other member.

Still alternatively, other operation section for the directional keys may be provided on the outside of the operation section 35 so that input operation to the other operation section is detected as the translational motion of the operation body along the XY plane, and that input operation to the operation section 35 is detected as the rotational motion of the operation body about the rotational axis that extends along the XY plane. Still alternatively, directional keys may be provided on the detection section 441 of the second detecting body 44 that includes an orthogonal two-axis analog pad.

In the first embodiment, the operation section 35 is provided on the end portion of the shaft section 331 on the tip side in the Z direction in a manner free to tilt, and the projecting portions 3517 are provided on the operation section 35 to press the pressure-sensing elements 433 of the first detecting body 43 via the pressers 512. However, the present invention is not limited thereto. That is, pressure-sensing elements may be provided on the operation section 35, and projecting portions may be provided at the position where the pressure-sensing elements 433 were provided to press the pressure-sensing elements.

In the first embodiment, the first detecting body 43 includes the four pressure-sensing elements 433 that are arranged equidistantly along the circumference of the shaft section 331. Further, in the second embodiment, the first and second detection sections 66 and 67 include the four pressure-sensing elements 662 and the four pressure-sensing elements 672, respectively. The pressure-sensing elements 662 and 672 are arranged equidistantly along the circumference of the shaft section 62. However, the present invention is not limited thereto. That is, the number of the pressure-sensing elements may be three or five or more.

Still further, one of the first and second detection sections 66 and 67 may be provided as described earlier.

In the first embodiment, the first detecting body 43 has the plurality of pressure-sensing elements 433. Further, the second detecting body 44 has an orthogonal two-axis analog pad. Still further, the third detecting body 41 has a potentiometer. However, the present invention is not limited thereto. That is, each of these detecting bodies may have other types of dynamic sensors, displacement sensors, or optical sensors. The same is true for the fourth and fifth detecting bodies 42 and 36. Further, the same is true for the detecting body 64 illustrated in the second embodiment.

In the configuration of the operator 3 illustrated in the first embodiment, for example, the rotational motion of the operation section 35 about the rotational axis that extends along the XY plane and the rotational motion thereof about the rotational axis that extends along the Z direction may be detected by the first detecting body 43 that includes a pressure-detecting multi-touch pad sensor. In this case, the third detecting body 41 can be omitted. Further, in the configuration of the operator 3 illustrated in the first embodiment, the rotational motion of the operation section 35 about the rotational axis that extends along the XY plane and the translational motion thereof along the XY plane may be detected by the first detecting body 43. In this case, the second detecting body 44 can be omitted. That is, the configuration of the operator 3 illustrated in the first embodiment and that of the operator 3A illustrated in the second embodiment may be combined.

Further, pressure-sensing elements adapted to detect only pressing forces may be used for the first detecting body 43. Alternatively, the pressing operation sections 361 and 421 provided respectively on the fifth and fourth detecting bodies 36 and 42 may be omitted so that the detection sections 362 and 422 are exposed. Conversely, the detection sections 362 and 422 may be omitted, and the pressing operation sections 361 and 421 may be provided to provide improved ease of use of the operation body 31.

Still further, the operation section 331A may be exposed by not providing the fifth detecting body 36. Alternatively, the support section 414 of the third detecting body 41 may be exposed by not providing the fourth detecting body 42. In this case, the face of the support section 414 on the root side in the Z direction serves as an operation section. In addition, if the rotational motion of the operation body 31 about the rotational axis that extends along the Z direction is not detected, or if this rotational motion is detected by other detecting body, the third detecting body 41 may be omitted. If the third and fourth detecting bodies 41 and 42 are omitted, the face of the third connecting section 40 on the root side in the Z direction serves as an operation section.

On the other hand, various push switches may be used rather than the fifth and fourth detecting bodies 36 and 42 having the detection sections 362 and 422, respectively. The push switches change the on/off status, for example, by a button.

In the second embodiment, the projecting portions 3517 provided on the operation sections 63 directly press the pressure-sensing elements 662 and 672. However, the present invention is not limited thereto. That is, an elastic member, for example, may be placed between each of the projecting portions 3517 and each of the pressure-sensing elements 662 and 672.

In each of the embodiments, the operating device according to the present invention has been cited as an operating device adapted to be connected to an information processor. However, the present invention is not limited thereto. For example, the operating device may be provided on a portable information terminal (mobile terminal).

INDUSTRIAL APPLICABILITY

The present invention is applicable to an operator provided on an operating device, and more particularly, to an operating device (controller) that is connected to an information processor such as PC or game console.

DESCRIPTION OF REFERENCE SYMBOLS

1 . . . Operating device, 3 . . . Operator, 31 . . . Operation body, 35 . . . Operation section (first operation section), 36 . . . Fifth detecting body (detection section), 37 . . . First connecting section, 39 . . . Second connecting section, 40 . . . Third connecting section, 41 . . . Third detecting body, 42 . . . Fourth detecting body, 43 . . . First detecting body, 44 . . . Second detecting body, 331 . . . Shaft section, 333 . . . Extension section, 411 . . . Base section, 413 . . . Pressure-sensing element, 392 . . . First boss (engagement section), 404 . . . First opening portion (opening portion formed in the third connecting section), 512 . . . Presser, 331A . . . Operation section (second operation section), 3517 . . . Projecting portion, 4311 . . . Hole portion (hole portion formed in the first detecting body), 4321 . . . Hole portion (hole portion formed in the first detecting body).

The invention claimed is:

1. An operator comprising:
an operation body having a shaft section that extends along a first direction, the operation body being operated by a user;
a first detecting body adapted to detect a rotational motion of the operation body about a rotational axis that extends along a plane, the plane being defined by second and third directions, the second direction being orthogonal to the first direction, and the third direction being orthogonal to the first and second directions; and
a second detecting body provided independently of the first detecting body to detect a translational motion of the operation body along the plane, wherein:
the operation body includes a first operation section that is provided on the shaft section in a manner free to rotate about the rotational axis that extends along the plane and that spreads outward in the direction of diameter of the shaft section, where the first operation section has at least three projecting portions that are provided equidistantly along the circumference of the shaft section and that protrude along the first direction,
the first detecting body detects the rotational motion of the first operation section about the rotational axis that extends along the plane, where the first detecting body includes: (i) a base section having a hole portion into which the shaft section is inserted; and (ii) at least three pressure-sensing elements each of which is provided at a position of the base section matching that of one of the projecting portions and to each of which a pressing force exerted by the projecting portion is transferred during the displacement of the first operation section, and
the second detecting body detects the translational motion of the shaft section along the plane.

2. The operator of claim 1, wherein
the operation body includes a second operation section that is located on the central axis of the shaft section and that is operated by the user, and
the second operation section is located on the inside of the first operation section as seen along the central axis of the shaft section.

3. The operator of claim 2, wherein a detection section is provided on the second operation section to detect the pressing operation of the user along the first direction.

4. The operator of claim 1, wherein
the projecting portions are provided on the first operation section in a manner free to project toward or retract from the first detecting body, and
the first operation section has biasing members each of which biases one of the projecting portions toward the first detecting body.

5. The operator of claim 1, comprising
pressers provided between the projecting portions and the pressure-sensing elements and pressing the pressure-sensing elements by being pressed by the projecting portions when the first operation section rotates about the rotational axis that extends along the plane;
each of the pressers being formed with an elastic body in the form of a flat plate;
a given clearance being provided between the projecting portions and the pressers.

6. The operator of claim 1, comprising a third detecting body that is provided independently of the first and second detecting bodies and detects a rotational motion of the operation body about a rotational axis that extends along the first direction.

7. The operator of claim 6, wherein
the second and third detecting bodies are connected to the shaft section,
the second detecting body detects the translational motion of the shaft section along the plane, and
the third detecting body detects the rotational motion of the shaft section about the rotational axis that extends along the first direction.

8. The operator of claim 7, wherein
the operation body includes:
an extension section that extends along the plane from the shaft section;
a first connecting section that supports the shaft section inserted into a hole portion formed in the first detecting body in a manner free to rotate about the rotational axis that extends along the first direction and that is attached to the second detecting body;
a second connecting section that is connected to the first connecting section to sandwich the second detecting body; and
a third connecting section that is located on the opposite side of the second detecting body relative to the second connecting section, with the third detecting body being attached to the third connecting section on the opposite side of the second connecting section, when the operator is seen along the first direction, the extension section and the third connecting section are connected on the outside of the first and second connecting sections that are connected with the second detecting body sandwiched therebetween, and the extension section and the third connecting section are free to rotate about the rotational axis that extends along the first direction independently of the first and second connecting sections, the second connecting section has an engagement section that is inserted into an opening portion formed in the third connecting section to engage with the third detecting body, the third connecting section and the third detecting body rotate together with the shaft section about the rotational axis that extends along the first direction, and the third detecting body detects the direction of rotational motion of the third detecting body relative to the engagement section.

9. The operator of claim 8, comprising a fourth detecting body that is provided on the opposite side of the third connecting section side on the third detecting body to detect the pressing operation along the first direction by the user.

10. An operating device comprising:

an operator including:

an operation body having a shaft section that extends along a first direction, the operation body being operated by a user;

a first detecting body adapted to detect a rotational motion of the operation body about a rotational axis that extends along a plane, the plane being defined by second and third directions, the second direction being orthogonal to the first direction, and the third direction being orthogonal to the first and second directions; and a second detecting body provided independently of the first detecting body to detect a translational motion of the operation body along the plane, wherein:

the operation body includes a first operation section that is provided on the shaft section in a manner free to rotate about the rotational axis that extends along the plane and that spreads outward in the direction of diameter of the shaft section, where the first operation section has at least three projecting portions that are provided equidistantly along the circumference of the shaft section and that protrude along the first direction, the first detecting body detects the rotational motion of the first operation section about the rotational axis that extends along the plane, where the first detecting body includes: (i) a base section having a hole portion into which the shaft section is inserted; and (ii) at least three pressure-sensing elements each of which is provided at a position of the base section matching that of one of the projecting portions and to each of which a pressing force exerted by the projecting portion is transferred during the displacement of the first operation section, and the second detecting body detects the translational motion of the shaft section along the plane.

\* \* \* \* \*